(12) United States Patent
Hao et al.

(10) Patent No.: US 11,372,118 B2
(45) Date of Patent: Jun. 28, 2022

(54) ION AND RADIATION DETECTION DEVICES BASED ON CARBON NANOMATERIALS AND TWO-DIMENSIONAL NANOMATERIALS

(71) Applicant: Northeastern University, Boston, MA (US)

(72) Inventors: Ji Hao, Boston, MA (US); Swastik Kar, Belmont, MA (US); Yung Joon Jung, Lexington, MA (US); Daniel Rubin, Boston, MA (US)

(73) Assignee: Northeastern University, Boston, MA (US)

( * ) Notice: Subject to any disclaimer, the term of this patent is extended or adjusted under 35 U.S.C. 154(b) by 310 days.

(21) Appl. No.: 16/331,648

(22) PCT Filed: Sep. 11, 2017

(86) PCT No.: PCT/US2017/051032
§ 371 (c)(1),
(2) Date: Mar. 8, 2019

(87) PCT Pub. No.: WO2018/132135
PCT Pub. Date: Jul. 19, 2018

(65) Prior Publication Data
US 2019/0243009 A1  Aug. 8, 2019

Related U.S. Application Data

(60) Provisional application No. 62/509,045, filed on May 19, 2017, provisional application No. 62/455,096, (Continued)

(51) Int. Cl.
*G01T 1/24* (2006.01)
*G01T 1/185* (2006.01)
(Continued)

(52) U.S. Cl.
CPC .............. *G01T 1/244* (2013.01); *B82Y 15/00* (2013.01); *G01T 1/185* (2013.01); *H01J 49/025* (2013.01);
(Continued)

(58) Field of Classification Search
CPC ......... G01T 1/244; G01T 1/185; B82Y 15/00; H01J 49/04; H01J 49/025; G01B 32/159; G01B 32/182; G01B 19/04
See application file for complete search history.

(56) References Cited

U.S. PATENT DOCUMENTS 8,466,413 B2     6/2013  Kotani et al.
2005/0109947 A1  5/2005  Turner et al.
(Continued)

FOREIGN PATENT DOCUMENTS

CN   106324077 A    1/2017
KR   20120121511 A  11/2012
(Continued)

OTHER PUBLICATIONS

Modi, et al., "Miniaturized gas ionization sensors using carbon nanotubes", Nature vol. 424, Jul. 10, 2003, pp. 171-174.
(Continued)

*Primary Examiner* — Hugh Maupin
(74) *Attorney, Agent, or Firm* — Verrill Dana, LLP

(57) ABSTRACT

Ultrasensitive, miniaturized, and inexpensive ion and ionizing radiation detection devices are provided. The devices include an insulating substrate, metallic contact pads disposed on a surface of the substrate, and a strip of an ultrathin two-dimensional material having a thickness of one or a few atomic layers. The strip is in contact with the contact pads, and a voltage is applied across the two-dimensional sensor material. Individual ions contacting the two-dimensional material alter the current flowing through the material and
(Continued)

are detected. The devices can be used in a network of monitors for high energy ions and ionizing radiation.

15 Claims, 23 Drawing Sheets

Related U.S. Application Data filed on Feb. 6, 2017, provisional application No. 62/385,919, filed on Sep. 9, 2016.

(51) Int. Cl.

| | |
|---|---|
| *B82Y 15/00* | (2011.01) |
| *H01J 49/02* | (2006.01) |
| *H01J 49/04* | (2006.01) |
| *C01B 32/159* | (2017.01) |
| *C01B 32/182* | (2017.01) |
| *C01B 19/04* | (2006.01) |

(52) U.S. Cl.
CPC .............. *H01J 49/04* (2013.01); *C01B 19/04* (2013.01); *C01B 32/159* (2017.08); *C01B 32/182* (2017.08)

(56) References Cited

U.S. PATENT DOCUMENTS

| | | | |
|---|---|---|---|
| 2005/0184294 | A1 | 8/2005 | Zhang |
| 2006/0109344 | A1 | 5/2006 | Maurer et al. |
| 2008/0277577 | A1 | 11/2008 | Funsten |
| 2008/0314149 | A1 | 12/2008 | Reuger |
| 2010/0140723 | A1 | 6/2010 | Kurtz |
| 2010/0183844 | A1 | 7/2010 | Xiong et al. |
| 2010/0308848 | A1 | 12/2010 | Kaul |
| 2012/0049054 | A1 | 3/2012 | Zhou et al. |
| 2012/0128880 | A1 | 5/2012 | Talapatra et al. |
| 2013/0240746 | A1 | 9/2013 | Murai et al. |
| 2013/0256525 | A1 | 10/2013 | Hill, Jr. et al. |
| 2013/0264474 | A1 | 10/2013 | Kholomeev et al. |
| 2013/0276512 | A1 | 10/2013 | Bae et al. |
| 2015/0276677 | A1 | 10/2015 | Li et al. |
| 2017/0263966 | A1* | 9/2017 | Lozada ............... H01M 8/1055 |
| 2018/0038001 | A1* | 2/2018 | Waduge .................... C25B 9/23 |
| 2019/0243009 | A1* | 8/2019 | Hao ...................... H01J 49/025 |

FOREIGN PATENT DOCUMENTS

| | | |
|---|---|---|
| WO | 2012074367 A1 | 6/2012 |
| WO | 2014075064 A2 | 5/2014 |

OTHER PUBLICATIONS

Wang et al., "Electronics and optoelectronics of two-dimensional transition metal dichalcogenicides", Nature Nanotchnology, vol. 7, Nov. 2012, pp. 699-712 doi: 10.1038/NNAN0.2012.193.

Zhang et al., "Single Carbon Nanotube Based Ion Sensor for Gas Detection", 2006 Sixth IEEE Conference on Nanotechnology, pp. 790-793, doi: 10.1109/NANO.2006.247777.

Stampfer et al., "Fabrication of Discrete Nanoscaled Force Sensors Based on Single-Walled Carbon Nanotubes", IEEE Sensors Journal, vol. 6, No. 3, Jun. 2006, pp. 613-617.

Wang et al., "Flexible gas sensors with assembled carbon nanotube thin films for DMMP vapor detection", Sensors and Actuators B 150 (2010) pp. 708-714.

An et al. Stable Aqueous Dispersions of Noncovalently Functionalized Graphene from Graphite and their Multifunctional High-Performance Applications Nano Lett., 2010, 10 (10), pp. 4295-4301.

An et al. Optical and Sensing Properties of 1-Pyrenecarboxylic Acid-Functionalized Graphene Films Laminated on Polydimethylsiloxane Membranes ACS Nano, 2011, 5 (2), pp. 1003-1011.

Kim et al. Voltage-switchable photocurrents in single-walled carbon nanotube-silicon junctions for analog and digital optoelectronics. Nature Photonics, 8, pp. 239-243, 2014.

Li et al. Highly Organized Two- and Three-Dimensional Single-Walled Carbon Nanotubes-Polymer Hybrid Architectures. ACS Nano, 5 (6), pp. 4826-4834, 2011.

Kim et al. Highly Aligned Scalable Platinum-decorated Single-wall Carbon Nanotube Arrays for Nanoscale Electrical Interconnects. ACS Nano, 3 (9), pp. 2818-2826, 2009.

Helbling et al. Ultrasmall single walled carbon nanotube pressure sensors, Micro Electro Mechanical Systems, MEMS 2009. IEEE 22nd International Conference (2009).

Ma et al. A carbon nanotube-based radiation sensor, International Journal of Robotics and Automation, vol. 22:49-58 (2007).

Mattmann et al. Pulsed gate sweep strategies for hysteresis reduction in carbon nanotube transistors for low concentration NO2 gas detection Nanotechnology 21 : 185501 (2010).

Sumanesekera et al. Effects of gas adsorption and collisions on electrical transport in single-walled carbon nanotubes, Physical Review Letters, vol. 85, pp. 1096-1099 (2000).

Wang et al. A review of carbon nanotube-based gas sensors, Journal of Sensors, vol. 2009, Article ID 493904, 1-24 (2009).

Kang et al. The use of semiconducting single-walled carbon nanotube films to measure X-ray dose. Carbon, Elsevier, Oxford, GB, vol. 50, No. 6, Jan. 10, 2012 (Jan. 10, 2012), pp. 2197-2201.

Ma et al. Effect of Percolation on Electrical Conductivity in a Carbon Nanotube-Based Film Radiation Sensor, Nanotechnology, 2008. Nano '08. 8th IEEE Conference on, IEEE, Piscataway, NJ, USA, Aug. 18, 2008 (Aug. 18, 2008), pp. 259-262.

Ispirian et al. Use of single carbon nanotubes and graphene in particle detectors and beam monitors. Nuovo Cimento C Societa Italiana Di Fisica Italy, vol. 34C, No. 4, Jul. 2011 (Jul. 1, 2011), pp. 521-528.

Arbabi et al. Ionization collecting of gamma radiation using two carbon nanotube electrodes. Optoelectronics and Advanced Materials—Rapid Communications vol. 4, No. 11, Nov. 2010, p. 1891-1893.

Wang et al. A Single-Walled Carbon Nanotube Network Gas Sensing Device. Sensors 2011, 11, 7763-7772.

Jesus et al. Latest Advances in Modified/Functionalized Carbon Nanotube-Based Gas Sensors. Nanomater. Nanotechnol. 2013.

\* cited by examiner

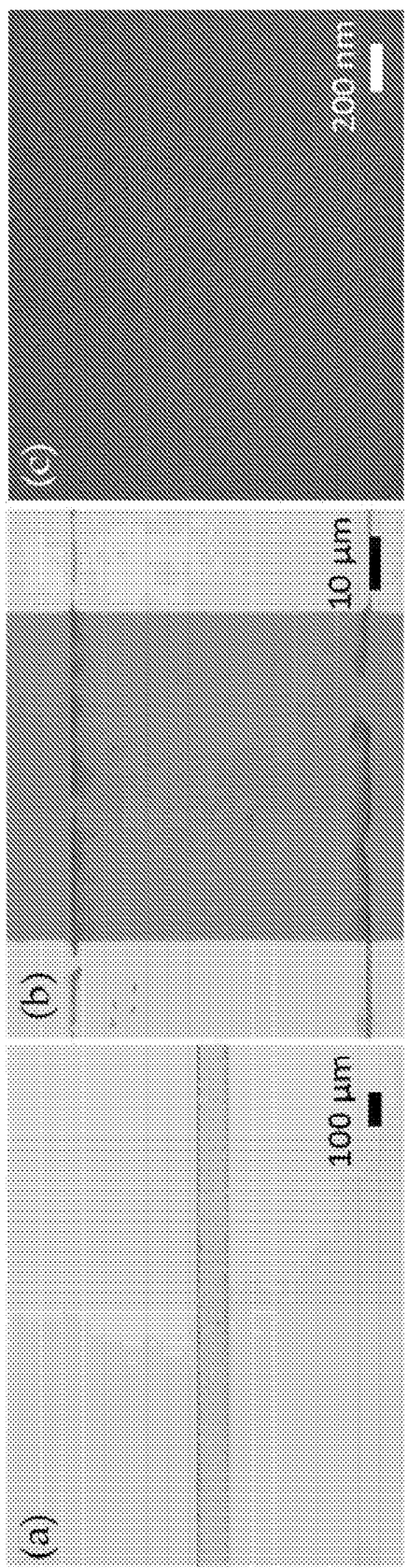
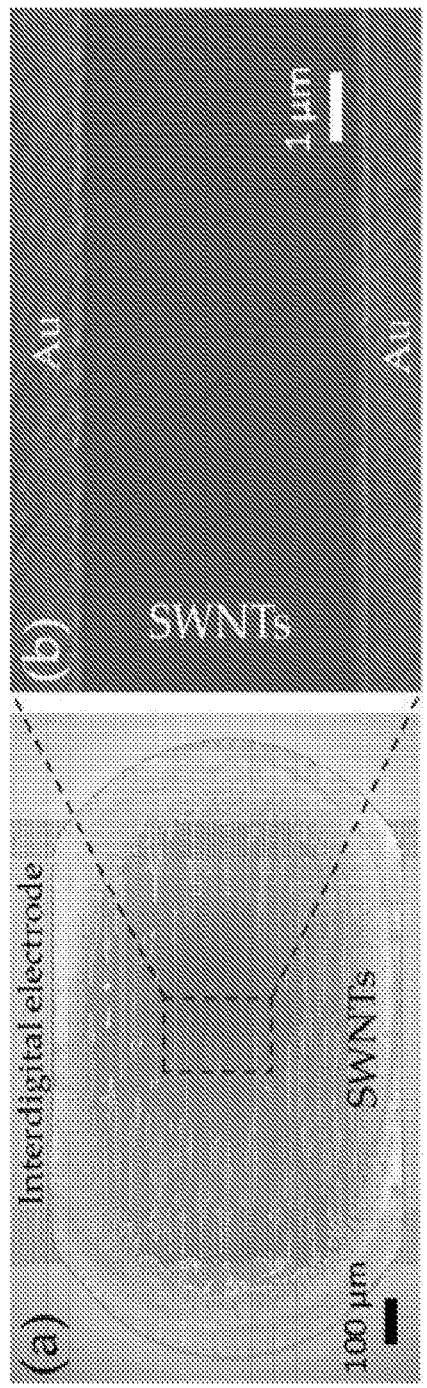

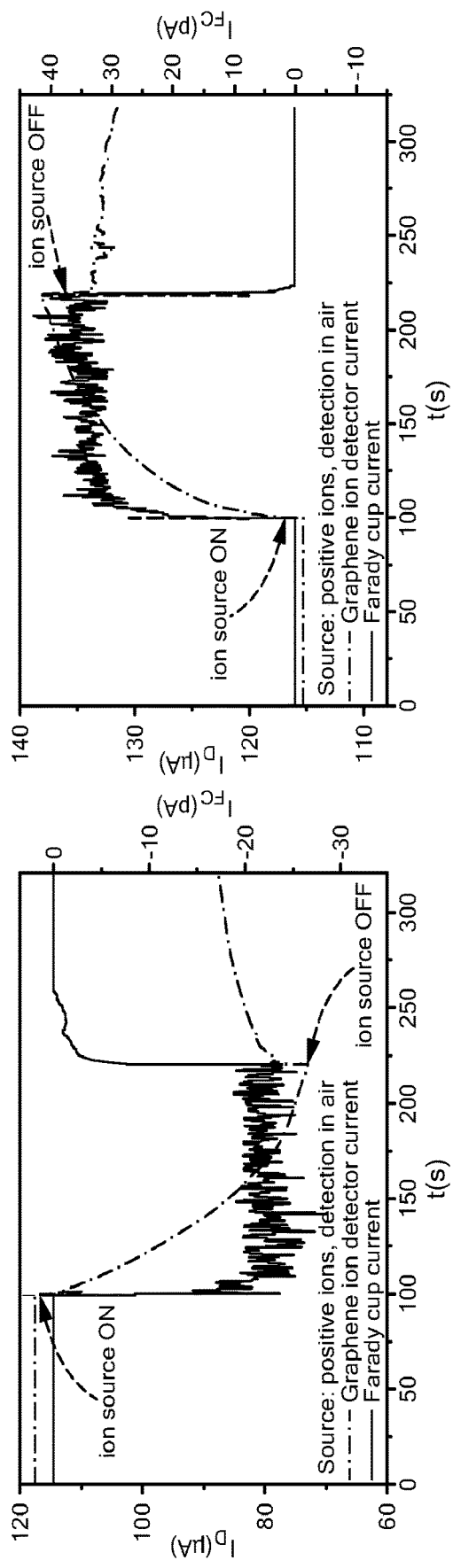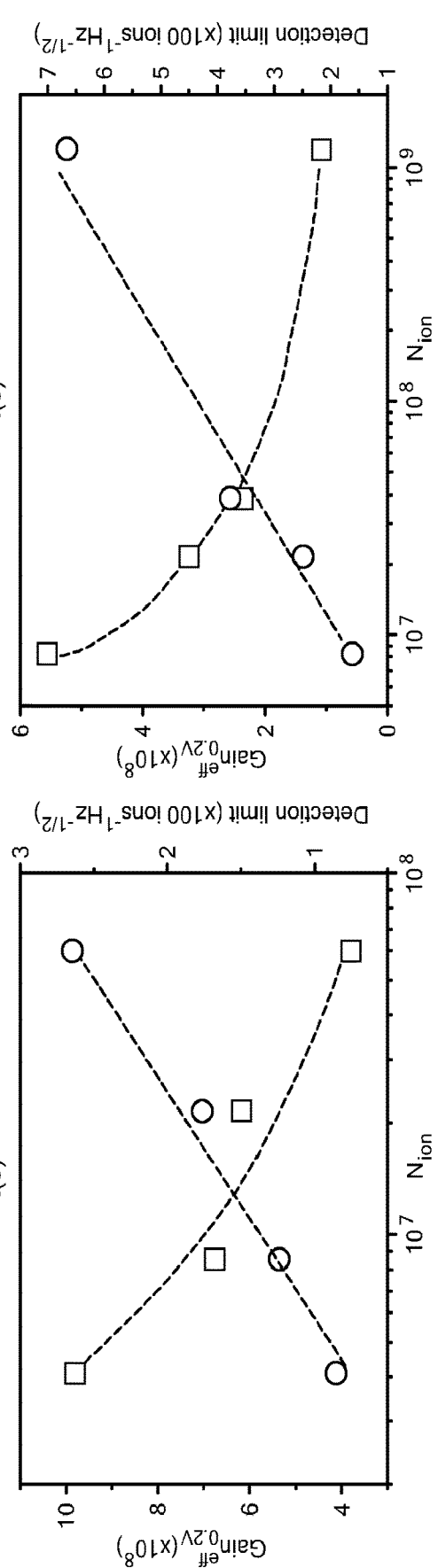

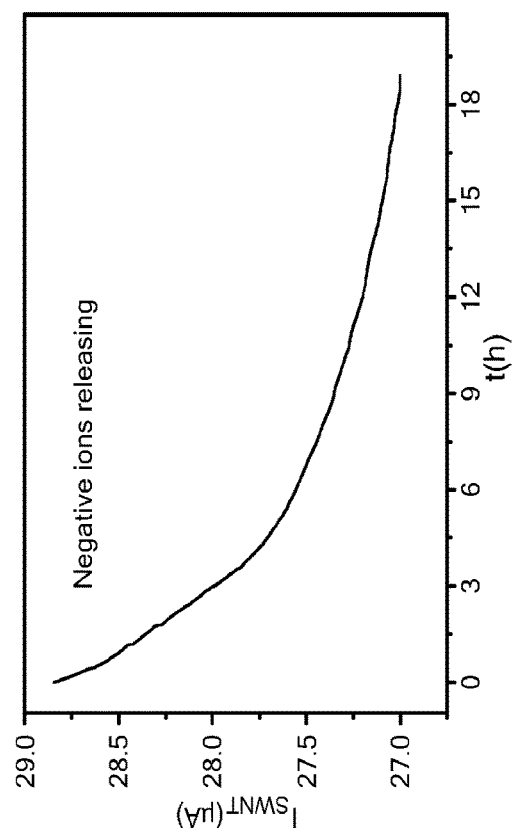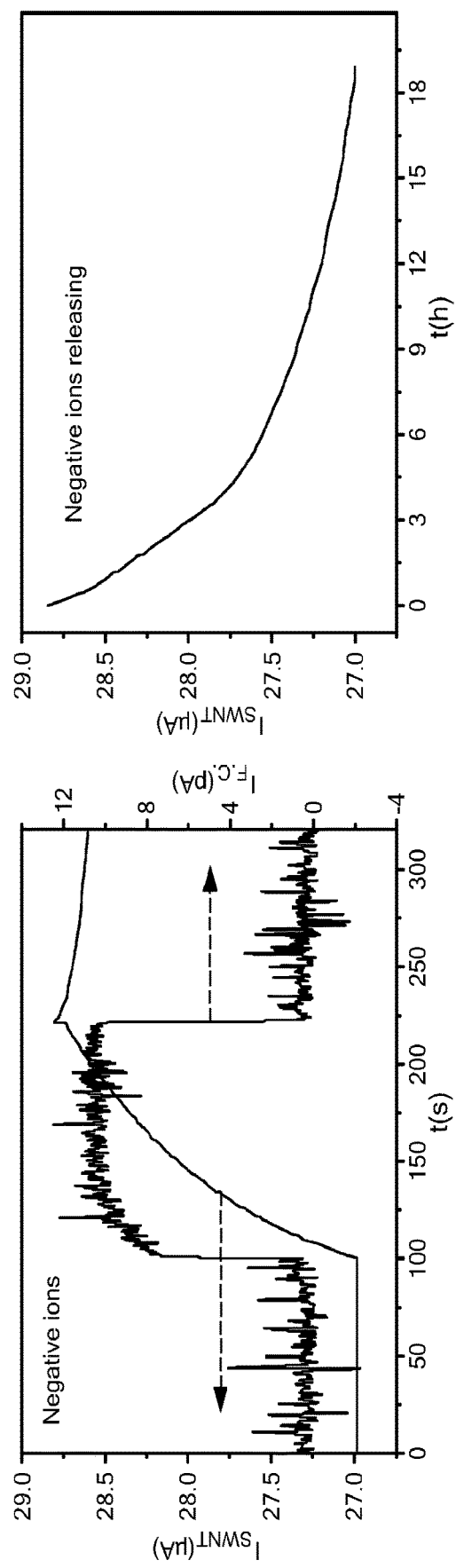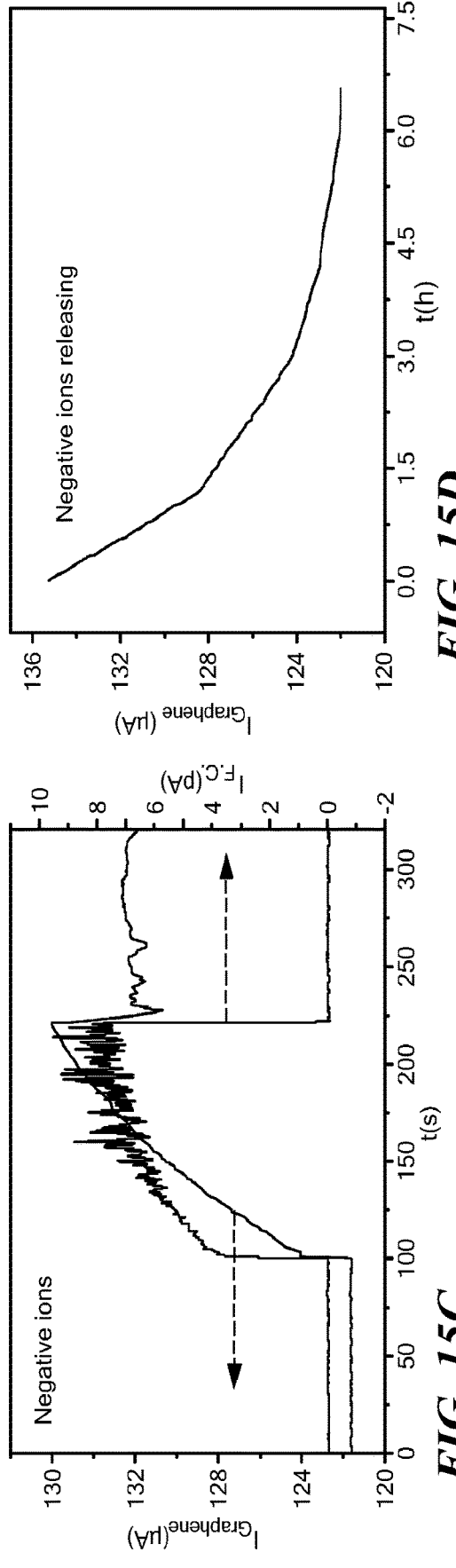
FIG. 15B
FIG. 15D
FIG. 15A
FIG. 15C (b) After ion detection (a) Before ion detection

US 11,372,118 B2

ION AND RADIATION DETECTION DEVICES BASED ON CARBON NANOMATERIALS AND TWO-DIMENSIONAL NANOMATERIALS

CROSS REFERENCE TO RELATED APPLICATIONS

This application claims the benefit under 35 U.S.C. § 119 of U.S. Provisional Patent Appl. Nos. 62/385,919, filed Sep. 9, 2016; 62/455,096, filed Feb. 6, 2017; and 62/509,045, filed May 22, 2017. The disclosures of the aforementioned applications are incorporated by reference in their entireties herein.

BACKGROUND

A variety of instruments are used to detect or count charged particles, including Faraday cups, Geiger counters, electron multiplier tubes, and solid-state semiconductor detectors (G. F. Knoll, 2010). These instruments are often bulky (J. E. Bruce, J. E. et al., 1994), require high operational voltages (Seamons, J. A. et al., 2008) and vacuum (Naik, A. K. et al., 2009), or are expensive or have poor detection limit. Therefore, a low-cost, lightweight, miniaturized, scalable, low-power, and ultrahigh-performance nanoelectronics-based ion-detection device would be highly desirable in many fields of application including imaging of radiation sources (Engelmohr, G. O. et al., 1970), and detection of radiation using unmanned radiation-monitoring vehicles (Okuyama, S. et al., 2008), and smart-city monitoring (Brennan, S. M. et al., 2004).

SUMMARY OF THE INVENTION

The present invention provides ultrasensitive, miniaturized, and inexpensive ion and ionizing radiation detection devices and methods of making and using such devices.

In one aspect, the invention provides an ion detecting device. The device includes an insulating substrate; first and second metallic contact pads disposed on a surface of the substrate; and a strip of an atomically-thin, layered, two-dimensional material. The strip has a first end and a second end, the first end in contact with the first pad and the second end in contact with the second pad. In certain embodiments, the material is not graphene. The device further includes a sealed housing enclosing the substrate, pads, and the two-dimensional material and forming a chamber. The chamber can be evacuated or comprise a gas that becomes ionized by radiation incident on the device. A potential difference applied across the pads causes current to flow through the two-dimensional material and ions present in the chamber are detected by a change in the magnitude of said current.

Embodiments of the above device can include one or more of the following features. In different embodiments, the two-dimensional material can be selected from the group consisting of GaS, GaSe, InS, InSe, $HfS_2$, $HfSe_2$, $HfTe_2$, $MoS_2$, $MoSe_2$, $MoTe_2$, $NbS_2$, $NbSe_2$, $NbTe_2$, $NiS_2$, $NiSe_2$, $NiTe_2$, $PdS_2$, $PdSe_2$, $PdTe_2$, $PtS_2$, $PtSe_2$, $PtTe_2$, $ReS_2$, $ReSe_2$, $ReTe_2$, $TaS_2$, $TaSe_2$, $TaTe_2$, $TiS_2$, $TiSe_2$, $TiTe_2$, $WS_2$, $WSe_2$, $WTe_2$, $ZrS_2$, $ZrSe_2$, and $ZrTe_2$. For example, the two-dimensional material can be $MoS_2$. In some embodiments, the chamber is evacuated. Alternatively, the chamber includes a gas that becomes ionized by radiation incident on the device. In some embodiments, at least $10^{13}$ carriers/cm$^2$ are induced in the material. For example, $6\times10^{13}$ to about $10^{14}$ carriers/cm$^2$ may be induced in the material. In certain embodiments, the charge-current amplification factor value is at least $10^8$ A C$^{-1}$. In some embodiments, the potential difference applied across the pads ranges from about 0.01V to about 6.0V. In one embodiment, the two-dimensional material has a width in the range from about 20 nm to about 100 μm. In one embodiment, the two-dimensional material has a length in the range from about 10 nm to about 1 mm. In one embodiment, the thickness of the two-dimensional material is in the range from about 11 nm to about 100 nm and its surface area is in the range from about 200 nm$^2$ to about 1.5 mm$^2$. In one embodiment, the weight of the device is in the range from about 100 μg to about 1 g. In various embodiments, the gas inside the chamber is Xe, Ar, Air, $N_2$, He, a mixture thereof, or Ar+0.5% acetylene. In one embodiment, the device is part of a radiation detector. In one embodiment, the device is part of a mass spectrometer.

In another aspect, the invention provides a method of quantifying an ionizing radiation. The method includes the steps of: (a) providing a device comprising: an insulating substrate; first and second metallic contact pads disposed on a surface of the substrate; a strip of an atomically-thin, layered, two-dimensional material, the strip having a first end and a second end, the first end in contact with the first pad and the second end in contact with the second pad; and a sealed housing enclosing the substrate, pads, and the two-dimensional material and forming a chamber; wherein the chamber is evacuated or comprises a gas that becomes ionized by radiation incident on the device; wherein a potential difference applied across the pads causes current to flow through the two-dimensional material and ions present in the chamber are detected by a change in the magnitude of said current; (b) exposing the device to the ionizing radiation or an ion source (optionally, one or several layers of materials may applied in front of the device to help reduce the intensity of the incoming radiation or lower the energy of radiation by transferring the incoming radiation to other types of radiation with lower energy); (c) measuring a change in current flow through the two-dimensional material upon exposure to the ionizing radiation or to the ion source; and (d) comparing the current to a standard curve correlating current flow to known amounts of ionizing radiation for the device to quantify said ionizing radiation.

Embodiments of the above method can include one or more of the following features. In different embodiments, the two-dimensional material can be selected from the group consisting of GaS, GaSe, InS, InSe, $HfS_2$, $HfSe_2$, $HfTe_2$, $MoS_2$, $MoSe_2$, $MoTe_2$, $NbS_2$, $NbSe_2$, $NbTe_2$, $NiS_2$, $NiSe_2$, $NiTe_2$, $PdS_2$, $PdSe_2$, $PdTe_2$, $PtS_2$, $PtSe_2$, $PtTe_2$, $ReS_2$, $ReSe_2$, $ReTe_2$, $TaS_2$, $TaSe_2$, $TaTe_2$, $TiS_2$, $TiSe_2$, $TiTe_2$, $WS_2$, $WSe_2$, $WTe_2$, $ZrS_2$, $ZrSe_2$, and $ZrTe_2$. For example, the two-dimensional material can be $MoS_2$. In one embodiment, no bias is applied to the material. In one embodiment, a bias is applied to the material. In one embodiment the bias applied does not exceed 0.2 V. In one embodiment, the chamber is evacuated. In one embodiment, the chamber comprises a gas that becomes ionized by radiation incident on the device. In embodiment, at least $10^{13}$ carriers/cm$^2$ are induced in the material.

In a further aspect the invention provides an ion detecting device including: an insulating substrate; first and second metallic contact pads disposed on a surface of the substrate; a strip of carbon-based nanomaterial (CNM) film, the strip having a first end and a second end, the first end in contact with the first pad and the second end in contact with the second pad; and a sealed housing enclosing the substrate, pads, and CNM film and forming a chamber. The chamber is evacuated or comprises a gas that becomes ionized by radiation incident on the device. A potential difference applied across the pads causes current to flow through the CNM film and ions present in the chamber are detected by a change in the magnitude of said current. The device possesses a charge-current amplification factor value exceeding $10^8$ A $C^{-1}$.

Embodiments of the above device can include one or more of the following features. In one embodiment, the chamber is evacuated. In one embodiment, the chamber comprises a gas that becomes ionized by radiation incident on the device. In one embodiment, ionization generates positive ions. In one embodiment, ionization generates negative ions. In certain embodiments, the potential difference applied across the pads ranges from about 0.01V to about 6.0V. In some embodiments, the CNM film has a width in the range from about 20 nm to about 100 µm. In certain embodiments, the CNM film has a length in the range from about 10 nm to about 1 mm. In one embodiment, the thickness of the CNM film is in the range from about 11 nm to about 100 nm and its surface area is in the range from about 200 $nm^2$ to about 1.5 $mm^2$. In certain embodiments, the weight of the device is in the range from about 100 µg to about 1 g. In certain embodiments, the gas inside the chamber is one of Ar, Air, $N_2$ and He. The device may further include a display. In one embodiment, the device includes an amperometry circuit that measures current through the CNM film. In certain embodiments, the CNM is single-walled carbon nanotubes (SWCNT). In one embodiment (with SWCNT as the CNM), the gain is at least $10^6$ and the detection limit is $10^3$ ions $s^{-1}$ $Hz^{-1/2}$. In one embodiment, the CNM is graphene. In one embodiment (with graphene as the CNM), the gain is at least $10^8$ the detection limit is $10^2$ ions $s^{-1}$ $Hz^{-1/2}$. In certain embodiments, CNM film consists of a single SWCNT. In some embodiments, the device is capable of measuring a single ion. In one embodiment, the device is part of an ionizing radiation detector. In one embodiment, the device is part of a mass spectrometer.

In yet another aspect, the invention provides a method of quantifying an ionizing radiation. The method includes providing a device comprising: an insulating substrate; first and second metallic contact pads disposed on a surface of the substrate; a strip of carbon-based nanomaterial (CNM) film, the strip having a first end and a second end, the first end in contact with the first pad and the second end in contact with the second pad; and a sealed housing enclosing the substrate, pads, and CNM film and forming a chamber; wherein the chamber comprises a gas that becomes ionized by radiation incident on the device. A potential difference applied across the pads causes current to flow through the CNM film and ions present in the chamber are detected by a change in the magnitude of said current. The device possesses a charge-current amplification factor value exceeding $10^8$ A $C^{-1}$. The method includes the steps of: exposing the device to the ionizing radiation; measuring a change in current flow through the CNM film of the device upon exposure to the ionizing radiation; and comparing the current to a standard curve correlating current flow to known amounts of ionizing radiation for the device to quantify said ionizing radiation.

Embodiments of the above method can include one or more of the following features. In one embodiment, no bias is applied to the material. In one embodiment, a bias is applied to the material. In one embodiment, the bias does not exceed 0.2 V. In one embodiment, the chamber is evacuated. In one embodiment, the chamber comprises a gas that becomes ionized by radiation incident on the device. In one embodiment, ionization generates positive ions. In one embodiment, ionization generates negative ions. In various embodiments, the gas inside the chamber is one of Ar, Air, $N_2$ and He. In certain embodiments, the CNM is single-walled carbon nanotubes (SWCNT). In some embodiments, the CNM is graphene. In one embodiment, the device is part of a network for detection of radiation that further includes a transmitter for relaying a signal when the device detects an ion.

The invention can be further summarized with the following listing of embodiments.

1. An ion detection device comprising:
   an insulating substrate;
   first and second metallic contact pads disposed on a surface of the substrate; a strip of a two-dimensional material, the strip having a first end and a second end, the first end in contact with the first pad and the second end in contact with the second pad, wherein the two-dimensional material is not graphene or a carbon-based nanomaterial; and wherein a potential difference applied across the pads causes current to flow through the two-dimensional material and ions contacting the two-dimensional material are detected by a change in the magnitude of said current.

2. The device of embodiment 1, wherein the two-dimensional material is selected from the group consisting of GaS, GaSe, InS, InSe, $HfS_2$, $HfSe_2$, $HfTe_2$, $MoS_2$, $MoSe_2$, $MoTe_2$, $NbS_2$, $NbSe_2$, $NbTe_2$, $NiS_2$, $NiSe_2$, $NiTe_2$, $PdS_2$, $PdSe_2$, $PdTe_2$, $PtS_2$, $PtSe_2$, $PtTe_2$, $ReS_2$, $ReSe_2$, $ReTe_2$, $TaS_2$, $TaSe_2$, $TaTe_2$, $TiS_2$, $TiSe_2$, $TiTe_2$, $WS_2$, $WSe_2$, $WTe_2$, $ZrS_2$, $ZrSe_2$, and $ZrTe_2$.

3. The device of embodiment 1 or 2, further comprising a sealed housing forming a chamber enclosing the substrate, contact pads, and strip of two-dimensional material, wherein the chamber is charged with an ionizable gas; and wherein the device functions as an ionizing radiation detector.

4. The device of embodiment 3, wherein the gas is selected from the group consisting of air, Ar, $N_2$, He, and combinations thereof.

5. The device of embodiment 1, further comprising a sealed housing forming a chamber enclosing the substrate, contact pads, and strip of two-dimensional material, wherein the chamber is evacuated to form a vacuum within the chamber; and wherein the device functions as a detector of ionized particles capable of penetrating the housing.

6. The device of any of the preceding embodiments, wherein at least $10^{13}$ carriers/$cm^2$ are induced in the material in the presence of ions.

7. The device of embodiment 6, wherein about $6 \times 10^{13}$ to about $10^{14}$ carriers/$cm^2$ are induced in the material.

8. The device of any of the preceding embodiments, wherein the charge-current amplification factor value is at least $10^8$ A $C^{-1}$.

9. The device of any of the preceding embodiments, wherein the strip of two-dimensional material has a width in the range from about 20 nm to about 100 µm and a length in the range from about 10 nm to about 1 mm.

10. The device of any of the preceding embodiments, wherein the thickness of the strip of two-dimensional material is in the range from about 1 nm to about 100 nm, and its surface area is in the range from about 200 $nm^2$ to about 1.5 $mm^2$.

11. The device of any of the preceding embodiments, wherein the weight of the device is in the range from about 100 µg to about 1 g.

12. The device of any of the preceding embodiments further comprising a processor, a memory, a transmitter, and a battery, wherein the device is capable of reporting measured values of detected ions to a remote receiver.

13. The device of embodiment 3 or embodiment 5, further comprising a processor, a memory, a transmitter, and a battery, wherein the device is capable of reporting measured values of detected ionizing radiation to a remote receiver.

14. A plurality of the devices of embodiment 13, linked to form a network for detection of ionizing radiation over an area.

15. The plurality of devices of embodiment 14, wherein at least 10, preferably at least 100, of said devices are distributed over a city.

16. The plurality of devices of embodiment 14, wherein at least 10 of said devices are distributed in an extraterrestrial environment.

17. The device of embodiment 1, configured as an ion sensor for use in a mass spectrometer.

18. A method of quantifying ions or ionizing radiation, the method comprising:

(a) providing a device any of the preceding embodiments, or a device comprising:
   an insulating substrate;
   first and second metallic contact pads disposed on a surface of the substrate;
   a strip of an atomically-thin, layered, two-dimensional material, the strip having a first end and a second end, the first end in contact with the first pad and the second end in contact with the second pad; and
   a sealed housing enclosing the substrate, pads, and the two-dimensional material and forming a chamber; wherein the chamber is evacuated or comprises a gas that becomes ionized by radiation incident on the device; wherein a potential difference applied across the pads causes current to flow through the two-dimensional material and ions present in the chamber are detected by a change in the magnitude of said current;

(b) exposing the device to ions or ionizing radiation capable of penetrating the housing;

(c) measuring a change in current flow through the two-dimensional material upon said exposing; and (d) comparing the current to a standard curve correlating current flow to known amounts of ions or ionizing radiation for the device to quantify said ions or ionizing radiation.

19. The method of embodiment 18, wherein the two-dimensional material is selected from the group consisting of GaS, GaSe, InS, InSe, $HfS_2$, $HfSe_2$, $HfTe_2$, $MoS_2$, $MoSe_2$, $MoTe_2$, $NbS_2$, $NbSe_2$, $NbTe_2$, $NiS_2$, $NiSe_2$, $NiTe_2$, $PdS_2$, $PdSe_2$, $PdTe_2$, $PtS_2$, $PtSe_2$, $PtTe_2$, $ReS_2$, $ReSe_2$, $ReTe_2$, $TaS_2$, $TaSe_2$, $TaTe_2$, $TiS_2$, $TiSe_2$, $TiTe_2$, $WS_2$, $WSe_2$, $WTe_2$, $ZrS_2$, $ZrSe_2$, and $ZrTe_2$.

20. The method of any of embodiments 18-19, wherein a bias from about 0.01 volt to about 6 volts is applied between the first and second contact pads.

21. The method of any of embodiments 18-20, wherein at least $10^{13}$ carriers/$cm^2$ are induced in the material by the presence of ions or ionizing radiation.

22. The method of any of embodiments 18-21, wherein the two-dimensional material is not graphene or a carbon-based nanomaterial.

23. An ion detecting device comprising:
   an insulating substrate;
   first and second metallic contact pads disposed on a surface of the substrate;
   a strip of carbon-based nanomaterial (CNM) film, the strip having a first end and a second end, the first end in contact with the first pad and the second end in contact with the second pad; and
   a sealed housing enclosing the substrate, pads, and CNM film and forming a chamber;
   wherein the chamber is evacuated or comprises a gas that becomes ionized by radiation incident on the device;
   wherein a potential difference applied across the pads causes current to flow through the CNM film and ions present in the chamber are detected by a change in the magnitude of said current, and wherein the device possesses a charge-current amplification factor value exceeding $10^8$ A $C^{-1}$.

24. The device of embodiment 23, wherein the device is capable of discriminating between positive and negative ions.

25. The device of embodiment 23 or 24, wherein the CNM is a film comprising single-walled carbon nanotubes (SWCNT) or graphene.

26. The device of any of embodiments 23-25, wherein the gain is at least $10^8$ and the detection limit is $10^2$ ions $s^{-1}$ $Hz^{-1/2}$.

27. The device of any of embodiments 23-26, wherein the device is capable of detecting a single ion.

BRIEF DESCRIPTION OF THE DRAWINGS

FIG. 1A shows microscopic images of assembled SWNT strip. FIG. 1B shows a SWNT device. FIG. 1C shows scanning electron microscope (SEM) image of assembled SWNTs.

FIG. 2A shows SEM images of a SWNT interdigital electrode device. FIG. 2B shows an expanded view of a portion of the device.

FIGS. 13A and 13C are graphs showing operation of a graphene-based ion detector "in air", when exposed, respectively, to positive ions and negative ions. The curves contacting the right axis at the top and bottom correspond, respectively, to Faraday cup current and the graphene ion detector current. FIGS. 13B and 13D are graphs each showing variation of effective gain and detection limits as a function of ion-dosage for positive and negative ion incidences, respectively. The trace connecting the squares corresponds to limits of detection and the trace connecting the circles corresponds to gain factor. The dashed lines are guides for the eyes.

FIG. 15A shows current responses of SWNT ion detector and Faraday cup to incident negative ions. FIG. 15C shows current responses of graphene ion detector and Faraday cup to incident negative ions. In each of FIGS. 14A and 14C, the top curve contacting the right axis corresponds to the current response of the SWNT ion detector, and the bottom curve to that of the Faraday cup. FIG. 15B shows current response of SWNT ion detector during release of negative ions in open air. FIG. 15D shows current response of graphene ion detector during release of negative in air.

In FIG. 22C, from the left end top, the curves correspond to no ion exposure, 2 min exposure, 6 min exposure, 12 min exposure, 20 min exposure, and 30 min exposure.

In FIG. 22C, from the left end, the curves from the top correspond to 30 min exposure, 20 min exposure, 12 min exposure, 6 min exposure, 2 min exposure, and no exposure. In FIG. 22D, from the right end, the curves from the bottom correspond to 315 seconds exposure, 195 seconds exposure, 75 seconds exposure, 30 seconds exposure, and no exposure. Recovery after 1 day is also shown in FIG. 23D (dashed curve).

DETAILED DESCRIPTION OF THE INVENTION

Figures 3A, 3B:
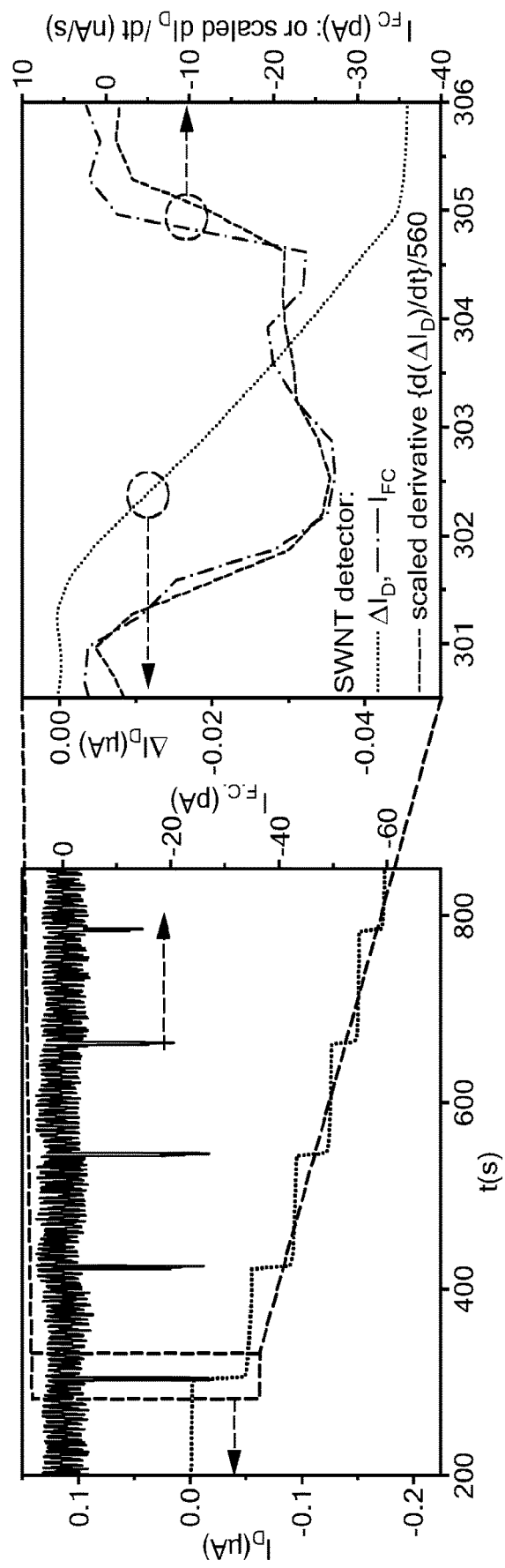
FIG. 3A is a graph showing the response of SWNT ion detector ($\Delta I_D$) to positive ions with multiple openings and closings.
FIG. 3B is a graph showing the response of the SWNT ion detector ($\Delta I_D$; bottom curve contacting the right axis), the rate of $\Delta I_D$ ($d(\Delta I_D)/dt$; middle curve contacting the right axis), and the response of Faraday cup ($I_{FC}$; top curve contacting the right axis).

Provided herein are ion detecting devices having an ion detector comprising a strip of carbon nanomaterial (e.g., single wall carbon nanotubes, graphene) or other atomically, thin, layered two-dimensional material inside a sealed housing forming a chamber. The chamber may be evacuated or contain a gas that becomes ionized by radiation incident on the device. A potential difference applied across the strip causes current to flow through it and ions present in the chamber are detected by a change in the magnitude of said current.

The present invention includes ion detecting devices based on vapour-phase gating induced ion detection, including single-ion detection in graphene and carbon nanotube networks. The devices work both under vacuum conditions and atmospheric pressure and distinguish positive and negative ions. The devices are light weight, have small dimensions, use low applied voltage and are easily integrated with COMS technology. Vapour phase gating can induce high carrier density in nanomaterials without requiring electrode, dielectric layer and electrolyte. It can be useful also in methods of characterizing the physical properties of nanomaterials, such as carbon nanotubes, graphene, and 2D materials.

Designing ultrasensitive detectors often requires complex architectures, high-voltage operations, and sophisticated low-noise measurements. The devices described herein, including those made with ion detectors comprising graphene or single-walled carbon nanotubes, are simple low-bias, two-terminal DC-conductance devices. These devices are extremely sensitive to ionized gas molecules. Incident ions form an electrode-free, dielectric- or electrolyte-free, bias-free vapor-phase top-gate that can efficiently modulate carrier densities up to ≈$0.6 \times 10^{13}$ carriers $cm^{-2}$. Surprisingly, the resulting current changes are several orders of magnitude larger than that expected from conventional electrostatic gating, suggesting the possible role of a currentgain inducing mechanism similar to those seen in photodetectors. These miniature detectors demonstrate charge-current amplification factor values exceeding $10^8$ A $C^{-1}$ in vacuum with undiminished responses in open air, and clearly distinguish between positive and negative ions sources. At extremely low rates of ion incidence, detector currents show stepwise changes with time, and calculations suggest that these stepwise changes can result from arrival of individual ions. These sensitive ion detectors are used to demonstrate a proof-of-concept low-cost, amplifier-free, light-emitting-diode-based low-power ion-indicator.

The present invention further includes detection of radiation by gas-filled ionization chamber containing carbon nanotube or graphene detectors. Radiations such as Beta, X-ray, Gamma and neutron radiations ionize gas molecules present within the chamber which results in a change in the current flowing through the detector, thereby leading to the detection of radiation. The sensitivity of carbon nanotube or graphene detector to ionized gas molecules is much higher than that of the metal plates inside a conventional gas-filled ionization chamber.

Conventional gas-filled ionization chamber require very high applied voltages (several hundred volts) to improve the sensitivity. But for the graphene and carbon nanotube detectors described herein are sensitive to ionized gas molecules at the low voltage, such as 0.2V, thereby reducing power consuming dramatically. Further, conventional gas-filled gas ionization instruments are complex systems requiring a supplier of high voltage, a cooling system, etc. In contrast, the graphene and carbon nanotube detectors described herein, since they need low applied voltages, are much smaller and size and lighter in weight minimize, which lowers the complexity of the whole instrument and makes it to fabricate, carry, and integrate into other systems.

Gas-filled graphene and carbon nanotube based ion detectors have many application. Because of their small size and light weight, they can be designed as radiation alarm attachments (e.g., badges, pens etc.) for clothing of hats, or integrated into other multifunction systems. These detectors can also be used in food safety and environmental pollution monitoring for detecting and analyzing harmful ingredients in food and hazardous pollutions. Radioisotope-labeled water can be used to track the origin of the pollution using the detectors described herein. Also, the detectors can be integrated into medical instruments, such as X-ray machine, to monitor the dose of radiation applied to the human body. Further, these detector can be used in space technology to investigate radiation in the universe, such as in the monitoring of solar wind, which contains charged particles derived from the upper atmosphere of the sun, and are harmful to global telecommunication network. In addition, due to the small size and light weight of the device, it can be easily to be carrier in man-made spacecraft, such as a satellite. Further still, given the presence of nuclear threat and potential radiation hazards and the resulting need for radiation monitoring at all times, the ion detectors described herein—due to their small size, low power consumption, and high sensitivity—can be devices of choice for real-time monitoring of these dangers. These detectors can be used in the military also for detecting radiation from a nuclear weapon and can be easily to be integrated into other systems as well as carried by individual soldier in the battlefield. These detectors can be used in radiation imaging also. Given their small dimension and light weight, they can be easily integrated into other systems, such as in the sensing elements of a digital camera in the form of a CCD (charge-coupled device), which can then be used to accurately record distribution of radiation. Also described herein are ultrasensitive ion detection devices having a detector comprising an atomically-thin, layered, or two-dimensional (2D) material. These 2D materials are highly suitable for ion detection. In these materials, binding of ions can lead to high density carrier inducement (measured up to $6 \times 10^{13}$ carriers/$cm^2$ and potentially up to and beyond $10^{14}$ carriers/$cm^2$).

EXAMPLES

Example 1

Carbon Nanotube Ion Detector

Fabrication of SWNT Devices

A. Wafer dicing and silicon substrate preparation: Photo resist protected $SiO_2$/Si wafer was diced into small rectangle chips (15 cm×12 cm) by a dicing saw (Micro Automation 1006). Next, the photoresist was removed in hot acetone (70° C.) followed by cleaning with Isopropyl alcohol (IPA) and deionized (DI) water, and drying in pure Nitrogen gas ($N_2$).

B. Piranha cleaning: Subsequently, in order to remove organic residuals, the $SiO_2$/Si chip was immersed in 105° C. hot piranha solution for 15 mins. The piranha solution was prepared by mixing by sulfuric acid ($H_2SO_4$) and hydrogen peroxide ($H_2O_2$) at a ratio of 2:1. After the piranha solution treatment, the $SiO_2$/Si chip was rinsed with DI water for 10 minutes and dried with $N_2$ for 5 min.

C. Plasma treatment: The surface of the $SiO_2$/Si chip was treated by inductively coupled plasma (ICP) ($O_2$: 20 sccm, $SF_6$: 20 sccm, Ar: 5 sccm) for 5 to 7 s to enhance the hydrophilic property of the surface of $SiO_2$ and further clean the $SiO_2$/Si chip.

SWNT Assembly for SWNT Devices

For devices having two terminals, the plasma treated $SiO_2$/Si chip was immediately spin-coated by photoresist and patterned using lithography. The patterned chip was then immersed vertically into the water based SWNT solution (purchased from Brewer science Inc. CNTRENE 100) and gradually pulled out of the solution at a constant speed of 0.05 mm/min using a dip coater. In general, two dip-coatings were performed with 180° up and down rotation to obtain a uniform SWNT thin film covering on all of the trenches patterned by the photoresist[2]. Next, the photoresist was removed using acetone, the chip cleaned with IPA and DI water, and dried with $N_2$. For electrical characterization, contact pads were patterned using lithography on the SWNT strip. Next, 80 nm Pd was deposited using a sputter coater.

This was followed by lifting off in acetone solution, thereby yielding contact pads. Junction areas between the contact pad and the SWNT strip were totally covered by photoresist and patterned by lithography to block incident ion flow.

For devices using an interdigital electrode used for ion detection, the interdigital electrode was patterned on a 100 nm $SiO_2$/Si chip by lithography. A droplet of SWNT solution was dropped on the interdigital electrode, and the chip dried on a 90° C. hotplate for 10 mins (see FIG. 2).

Response of SWNT Ion Detector to Positive Ions Under Vacuum Condition

Differential current response ($\Delta I_D = I_D(N_{ion}) - I_D(N_{ion}=0)$) of an SWNT detector (with a 0.2V applied voltage) to the periodic opening and closing of the positive ion source, and the current response ($I_{FC}$) was measured by a Faraday cup (with a −0.2V applied voltage) at the same time (see FIG. 3A). For this small amount of ion exposure, the rate of change of the current response of the SWNT ion detector, $d(\Delta I_D)/dt$, was also found to be proportional to the rate of the incident ions. As shown in FIG. 3B, $d(\Delta I_D)/dt$ and $I_{FC}$ curves have very similar shape.

Gain Factor and Detection Limit of a Carbon Nanotube Ion Detector Under Vacuum

Table 1 below shows results of data fitting of different functions of SWNT ion detector including gain factor and detection limit.

TABLE 1

Results of data fitting of functions of SWNT ion detector

| Y-axis | X-axis | Function |
| --- | --- | --- |
| $N_{ion}$ | D (cm): Distance | $\Delta N = 1.56 \times 10^9 \times 10^{(-0.028)D}$ |
| $\Delta I_{SWNT}$ (A) | $N_{ion}$ | $\Delta I_{SWNT} = 8.65 \times 10^{-12} \times N_{ion}^{0.504}$ |
| $\Delta Q_{SWNT}^{eff}$ (C) | $N_{ion}$ | $\Delta Q_{SWNT}^{eff} = 5.69 \times 10^{-11} \times N_{ion}^{0.491}$ |
| $Gain_{0.2V}^{eff}$ | $N_{ion}$ | $Gain_{0.2V}^{eff} = 3.55 \times 10^8 \times N_{ion}^{(-0.509)}$ |
| Detection Limit (DL) | $N_{ion}$ | $DL = 4.13 \times N_{ion}^{0.518}$ |

Figure 4B:
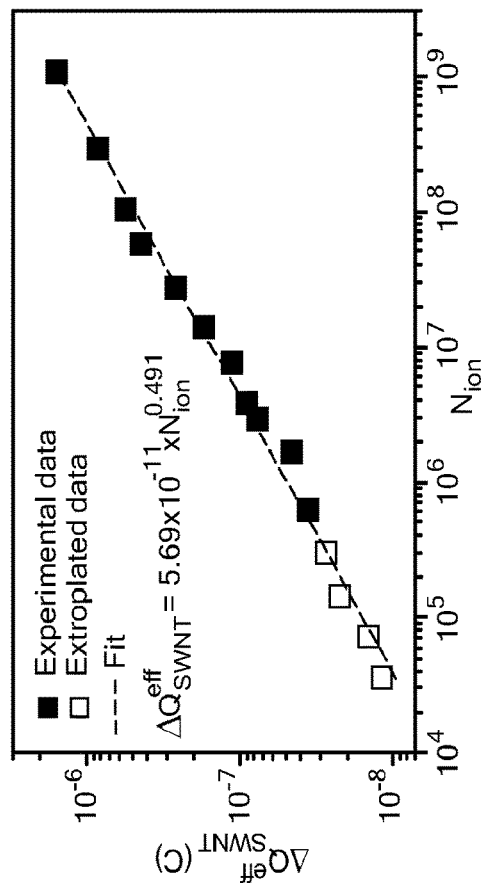
FIG. 4B shows variation of the effective charge change, $\Delta Q_{SWNT}^{eff}$, as a function of incident ions ($N_{ions}$).
Figure 4D:
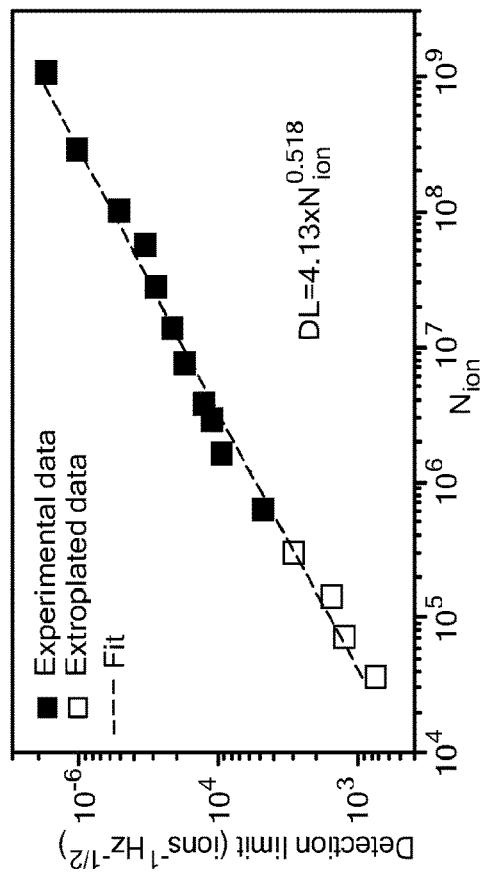
FIG. 4D shows variation of the detection limit (DL) as a function of $N_{ion}$.
Figure 4A:
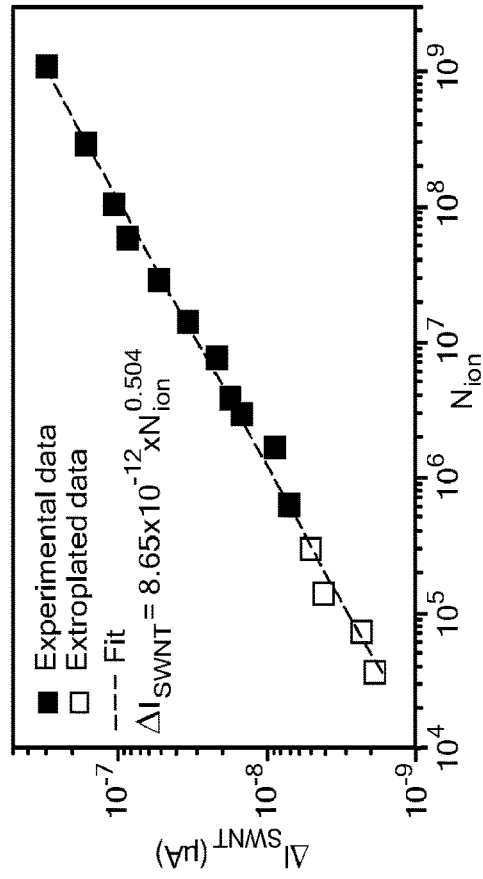
FIG. 4A is a graph showing fitting of data of variation of the current change, $\Delta I_{SWNT}$, as a function of $N_{ion}$.
Figure 4C:
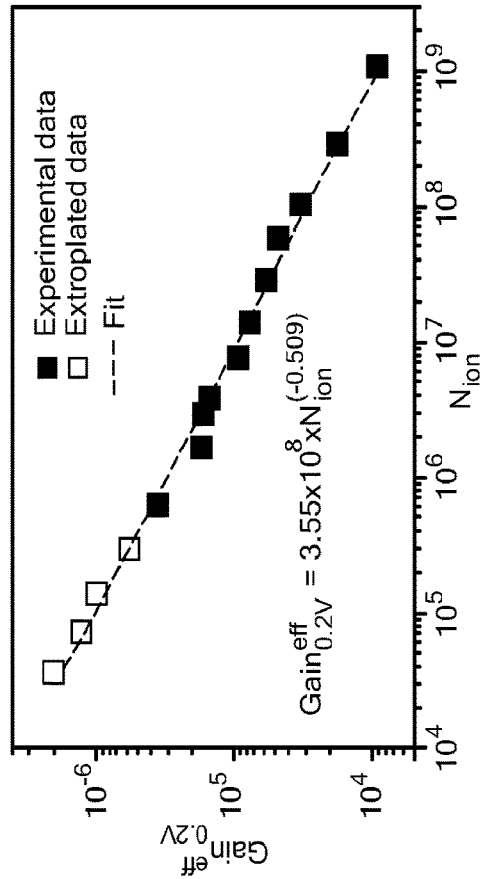
FIG. 4C shows variation of the effective gain, $Gain_{0.2V}^{eff}$, as a function of $N_{ion}$.

Fitting of data for variation of the current change, $\Delta I_{SWNT}$, as a function of incident ions, $N_{ion}$, is shown in FIG. 4A. FIG. 4B shows variation of effective charge change, $\Delta Q_{SWNT}^{eff}$, as a function of $N_{ion}$. Variation of effective gain, $Gain_{0.2V}^{eff}$, as a function of $N_{ion}$ is shown in FIG. 4C, and variation of detection limit (DL) as a function of $N_{ion}$ is shown in FIG. 4D.

Single-Ion Detection by Carbon Nanotube Ion Detector in the Vacuum

Figure 5B:
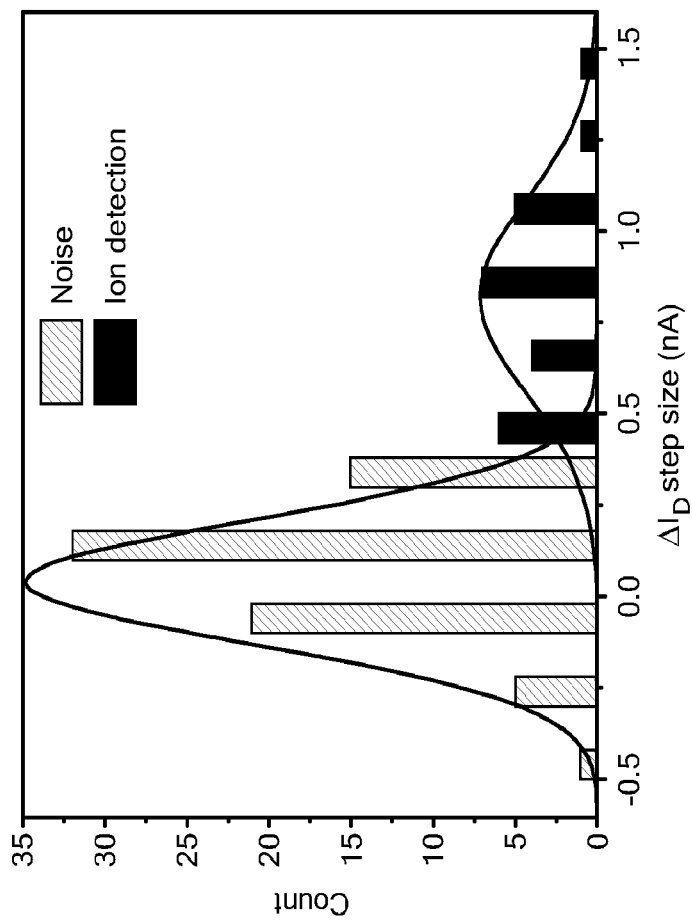
FIG. 5B shows separation of noise from signal due to ions.
Figure 5A:
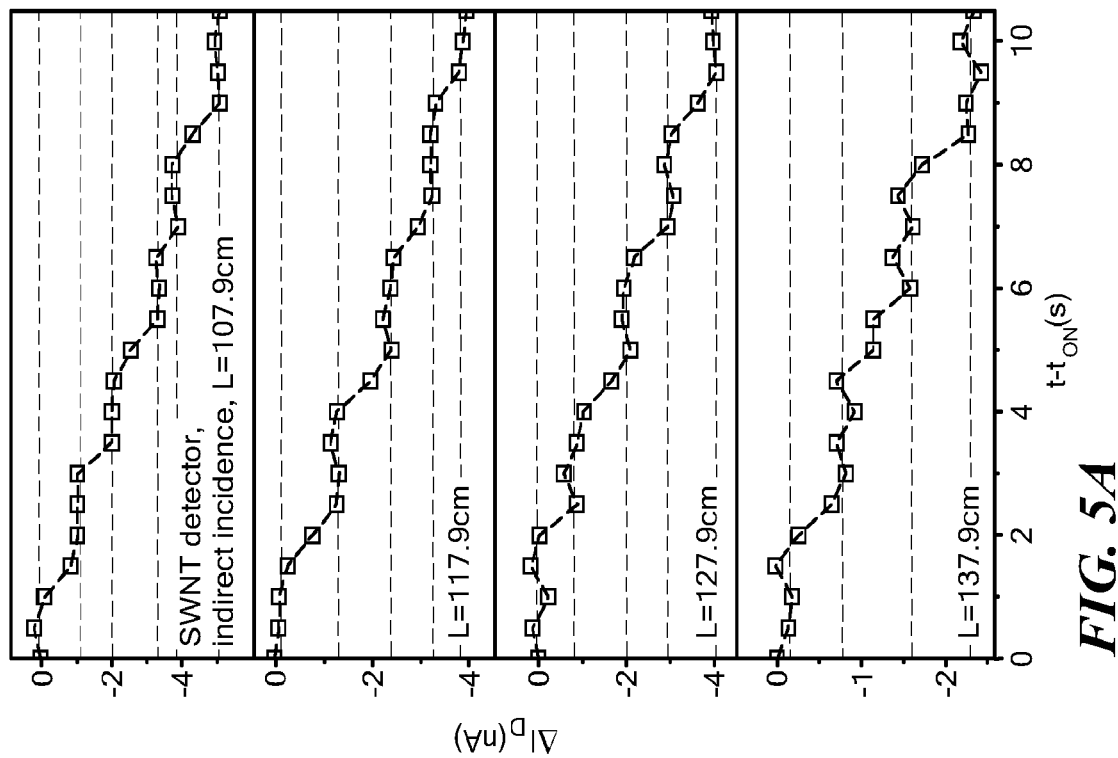
FIG. 5A is a graph showing single-ion detection by a carbon nanotube ion detector at different distances while keeping the detector at indirect incidence.
Figure 6A:
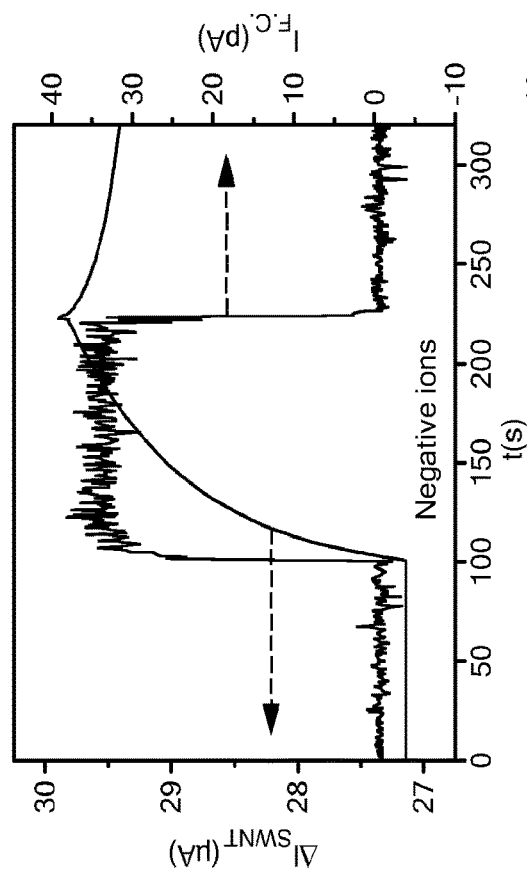
FIGS. 6A and 6B are graphs showing response and performance of an SWNT ion detector in the air to positive ions and negative ions, respectively.
Figure 6B:
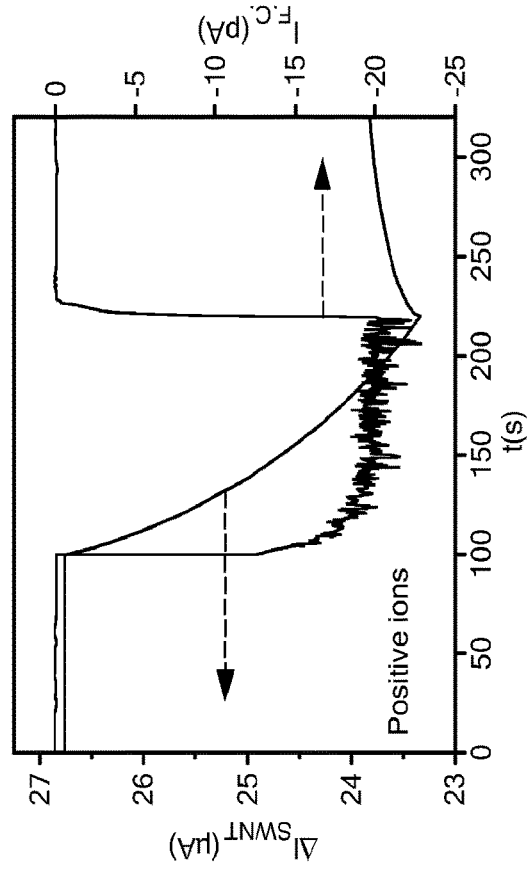
Figure 6C:
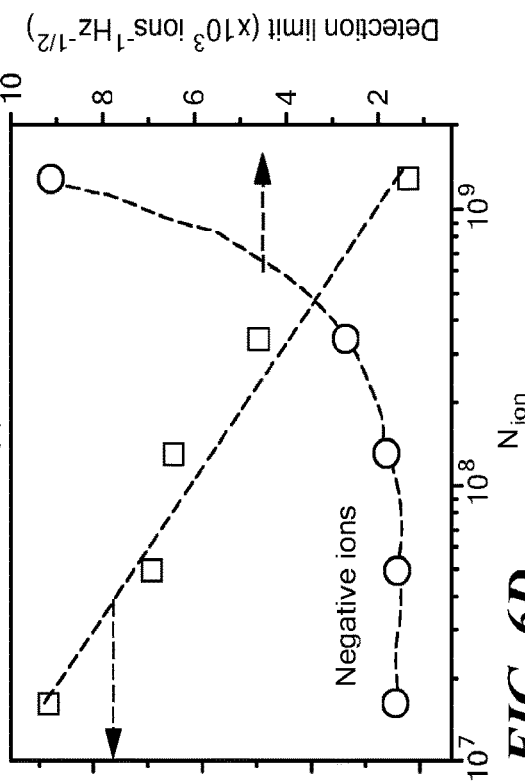
FIGS. 6C and 6D are graphs showing variation in the effective gain factor and detection limit as the number, respectively, of positive and negative incident ions varies. The dashed lines serve as guides to the eye. For both positive and negative ions, the effective gain can be up to $5 \times 10^6$ and the detection limit is down to $10^3$ ion $s^{-1}$ $Hz^{-1/2}$.
Figure 6D:
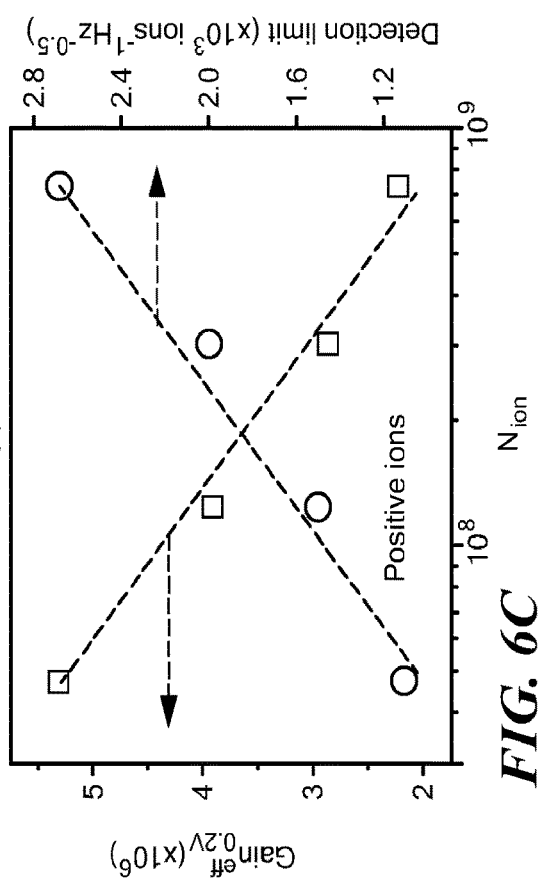

The carbon nanotube ion detector was also tested for its ability to detect single ions. The measurements were carried out at different source to detector distances, always keeping the detector at indirect incidence, (see FIGS. 5A and 5B). Gradual change in the source-detector distance was found to result in lowering of ion-appearance events per second from the closest (5 events in 10 seconds) to the farthest (3 events in 10 seconds). This provided evidence that the events recorded were indeed single-ion events from the ion-source, and not from other (e.g. celestially-caused) sources.

Positive and Negative Ions Detection by SWNT Ion Detector in the Air

Detection of positive and negative ions by the SWNT ion detector in air was performed at different source to SWNT ion sensor/Faraday cup distances (see FIG. 6A-6D). It was found that the SWNT ion detector can clearly distinguish incident positive ions and negative ions, and that the effective gain factor can be up to $5 \times 10^6$ and the detection limit can be down to $10^3$ ion $s^{-1}$ $Hz^{-1/2}$.

Figure 7:
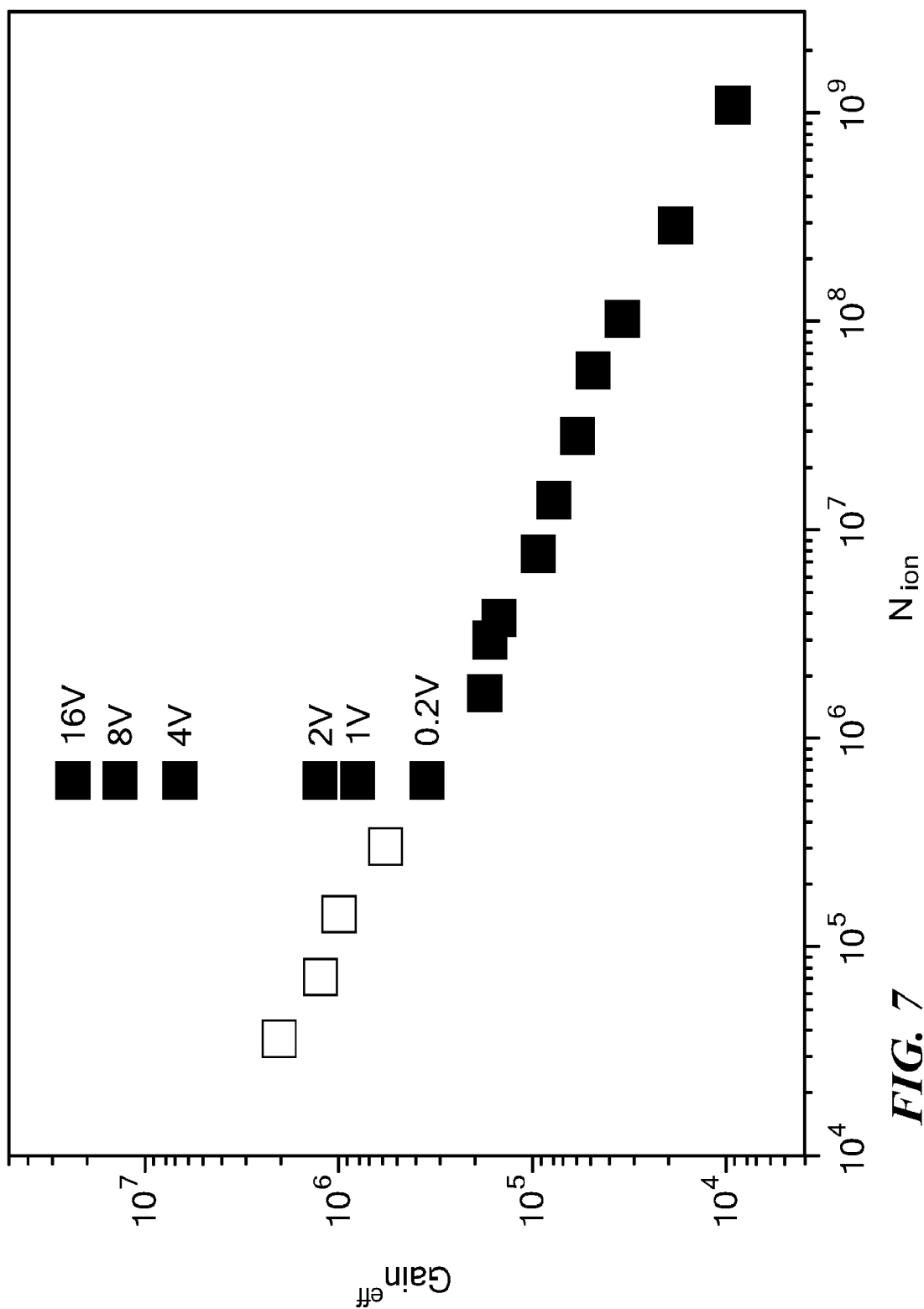
FIG. 7 is a plot showing change in effective gain of positive ions measured by an SWNT ion detector as a function of applied voltage under vacuum conditions.

Change of Effective Gains of SWNT Ion Detector with Different Applied Bias to Positive Ions Under Vacuum Detection of positive ions by the SWNT ion detector operated at different applied bias was performed as described in the section above but under conditions of vacuum in the chamber. It was found that increase in the applied bias led to increase in the effective gain, even though the number of incident ions was almost the same. At 16V, the effective gain jumped significantly to $2.5 \times 10^7$, which is 2 orders of magnitude of the effective gain at 0.2V (see FIG. 7).

Field Effect Test of the SWNT Device with Ion Exposure

Figure 8A:
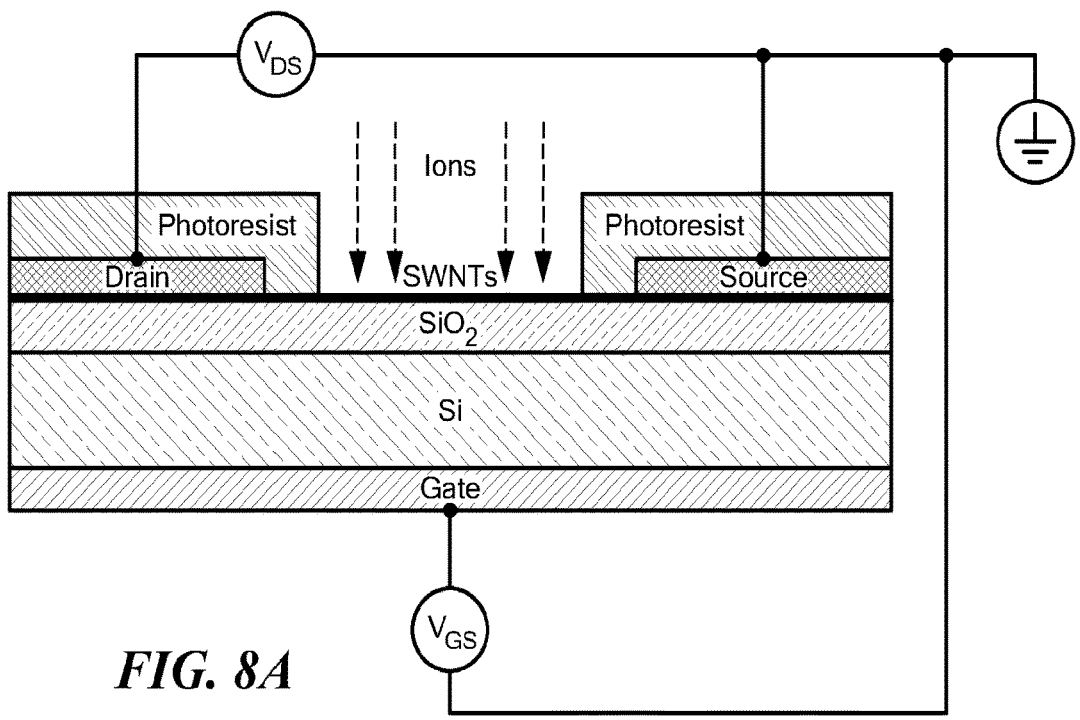
FIG. 8A is a schematic diagram of a configuration to test gating effect of the SWNT device.
Figure 8B:
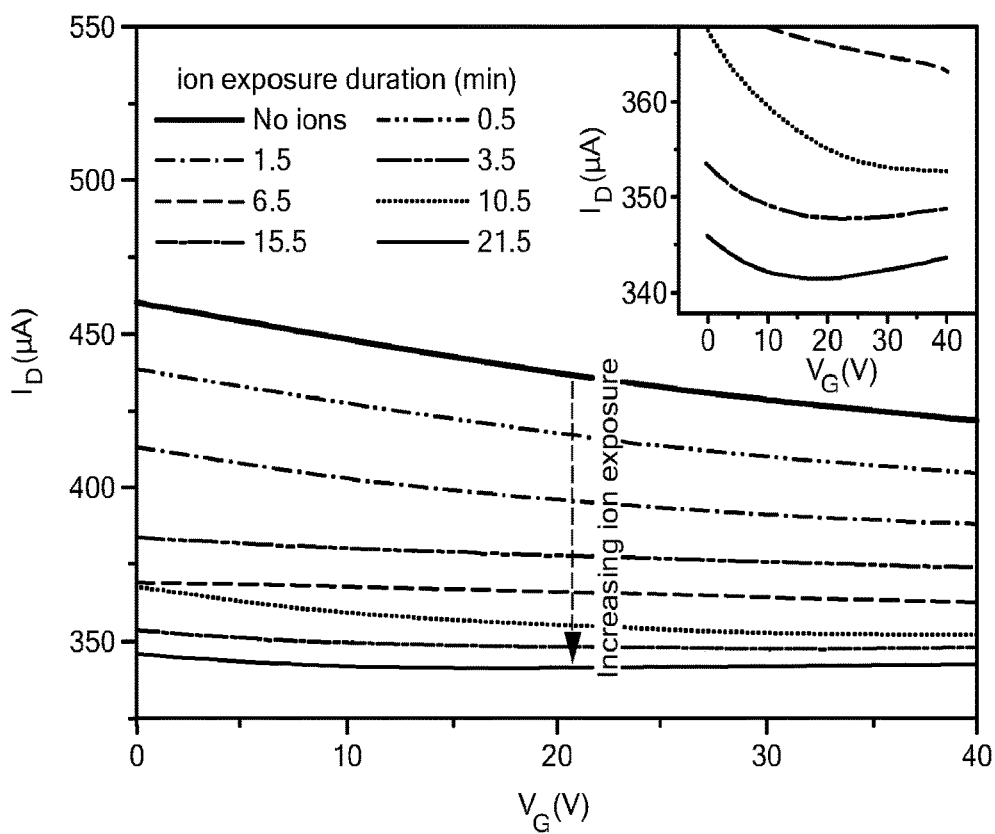
FIG. 8B is a plot of variation of source-drain current as a function of gate voltage. The topmost curve corresponds to no ions. The curves below correspond, in order, to the following ion exposure durations (in minutes): 0.5, 1.5, 3.5, 6.5, 10.5, 15.5, 21.5.

SWNT devices with a 3-terminal FET-configuration (Drain, source and gate) were fabricated to perform field effect test in the vacuum chamber during ion exposure. These devices were fabricated by spin-coating solution processed SWNTs on pre-fabricated interdigitated electrodes which appeared to show shallow response to voltages applied with back-gate electrode (FIG. 8A). It was noted that when the SWNT films were several tens of nanometers thick, it was challenging to obtain true gating effect using a back gate. The applied source and drain voltage ($V_{SD}$) was 0.1V and the sweep range of gate voltage was from 0V to 40V. Transfer characteristics ($I_D$-Vg) curves were measured initially and after several positive ion exposures with increasing exposure time, as shown in FIG. 8B. From an initial shallow p-type behavior, the channel current decreases very gradually as a function of ion-exposure, with the appearance of a very shallow "threshold" of an off state for the semiconducting nanotubes in the film. These shallow threshold have been highlighted for the four lowest-current curves in the inset of FIG. 8B. It appears that the slight shift the of "threshold" voltage towards the left is similar to the shift of the charge-neutrality point of graphene to the left under similar conditions, leading to the conclusion that vapor-phase gating plays a similar role in SWNTs as it does in graphene.

Example 2

Graphene Ion Detector

Synthesis of Graphene

Graphene was grown by Chemical Vapor Deposition (CVD)[1]. A 25 μm thick copper (Cu) foil, purchased from AlfaAesar (No. 46986), was etched in dilute nitric acid. The foil was rinsed with DI water and dried in Argon (Ar). Next, the Cu foil was folded into a pocket and annealed at 975° C. in a tube furnace for 1 hour with hydrogen flowing at 5 sccm. Methane flowing at 35 sccm was added into the tube furnace (with hydrogen flowing) for 30 minutes. Next, the furnace was opened and allowed to cool. Graphene was transferred from the Cu foil to a $SiO_2$/Si substrate using Poly (methyl methacrylate) (PMMA) as a supporting material. For this transfer, PMMA was spin-coated on the graphene-Cu foil and the foil gradually etched by diluted nitric acid. PMMA-graphene film floating in the nitric acid was fished out by a $SiO_2$/Si chip. The chip was cleaned with DI water and dried under Argon (Ar). It was next immersed in acetone to remove PMMA. Finally, the chip was cleaned with IPA and DI water and dried under Ar for further device fabrication.

Fabrication of Graphene Device

Figure 9:
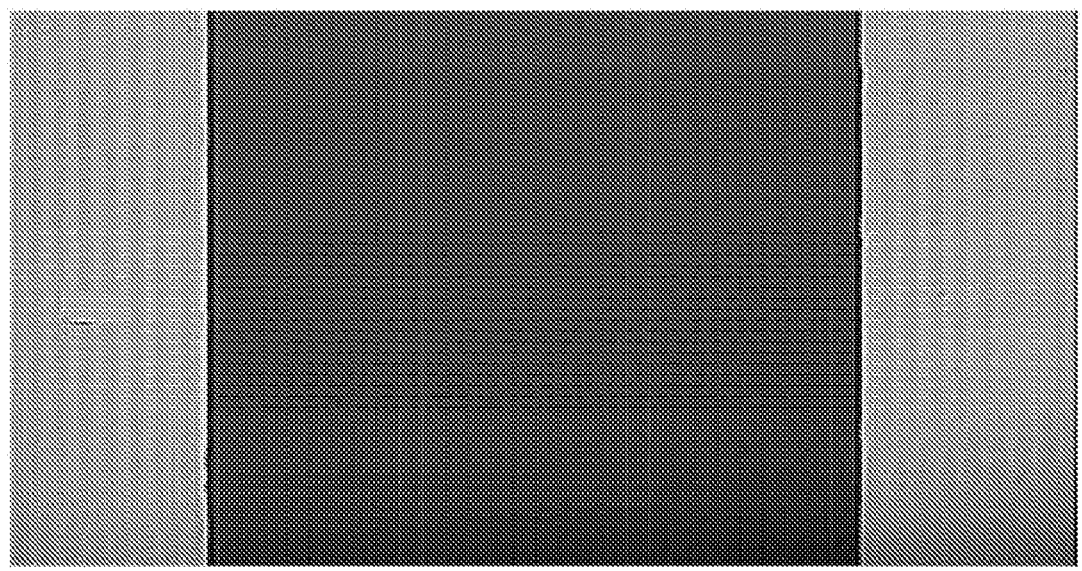
FIG. 9 shows a monolayer graphene device.

Graphene on the $SiO_2$/Si substrate was patterned by optical lithography and then etched by $O_2$ plasma to form a 100 μm width graphene strip. Next, contact pads were patterned on the graphene strip by lithography. Ti (5 nm) and Au (100 nm) were deposited using electron beam evaporator followed by the lift-off (see FIG. 9). Photoresist was patterned by lithography to protect the junction areas between electrodes and graphene from ion flux.

Response of Graphene Ion Detector to Positive Ions Under Vacuum

Figure 10:
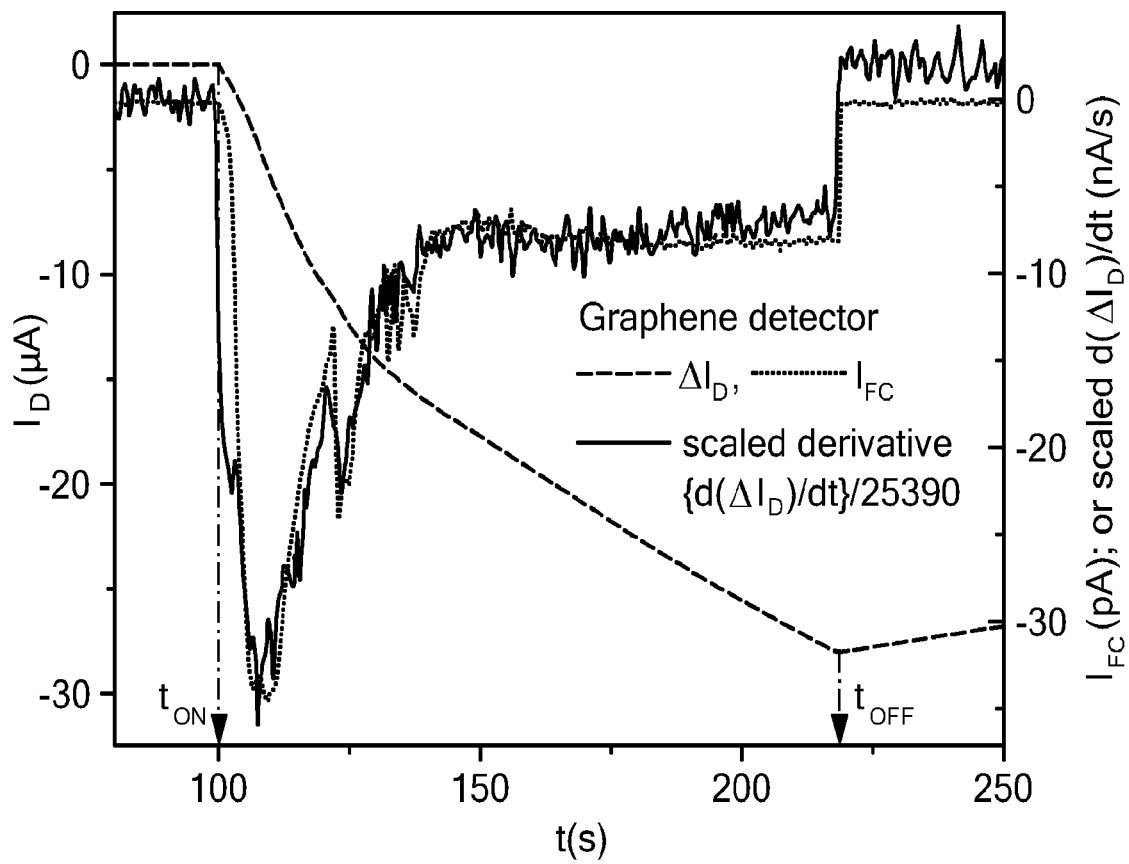
FIG. 10 is a plot showing response ($\Delta I_D$) of graphene ion detector to positive ions with opening and closing of ion source. The topmost, the middle, and the bottom curve contacting the right axis, respectively, show the rates of the scaled derivative, $\Delta I_D$ (d($\Delta I_D$)/dt), response of Faraday cup ($I_{FC}$), and response of the detector, $\Delta I_D$.

Differential current response ($\Delta I_D = I_D(N_{ion}) - I_D(N_{ion}=0)$) of a graphene detector (with 0.2V applied voltage) to the opening and closing of the positive ion source and the current response ($I_{FC}$) was measured by a Faraday cup (with −0.2V applied voltage) at the same time (see FIG. 10). For this small amount of ion exposure, the rate of change of the current response of the graphene detector, $d(\Delta I_D)/dt$, was also found to be proportional to the rate of the incident ions. As shown in FIG. 10, $d(\Delta I_D)/dt$ and $I_{FC}$ curves have the very similar shape.

Gain factor and Detection Limit of a Carbon Graphene Detector Under Vacuum

Table 2 below shows results of fitting of data for different functions of graphene detector including gain factor and detection limit.

TABLE 2

Results of data fitting of functions of graphene detector

| Y-axis | X-axis | Function |
|---|---|---|
| $N_{ion}$ | D (cm): Distance | $N_{ion} = 5.84 \times 10^8 \times 10^{(-0.029)D}$ |
| $\Delta I_{graphene}$ (A) | $N_{ion}$ | $\Delta I_{graphene} = 4.61 \times 10^{-3} \times N_{ion}^{0.497}$ |
| $\Delta Q_{graphene}^{eff}$ (C) | $N_{ion}$ | $\Delta Q_{graphene}^{eff} = 2.72 \times 10^{-7} \times N_{ion}^{0.511}$ |
| $Gain_{0.2V}^{eff}$ | $N_{ion}$ | $Gain_{0.2V}^{eff} = 1.12 \times 10^{12} \times N_{ion}^{(-0.462)}$ |
| Detection limit (DL) | $N_{ion}$ | $DL = 0.00173 \times N_{ion}^{0.694}$ |

Figure 11B:
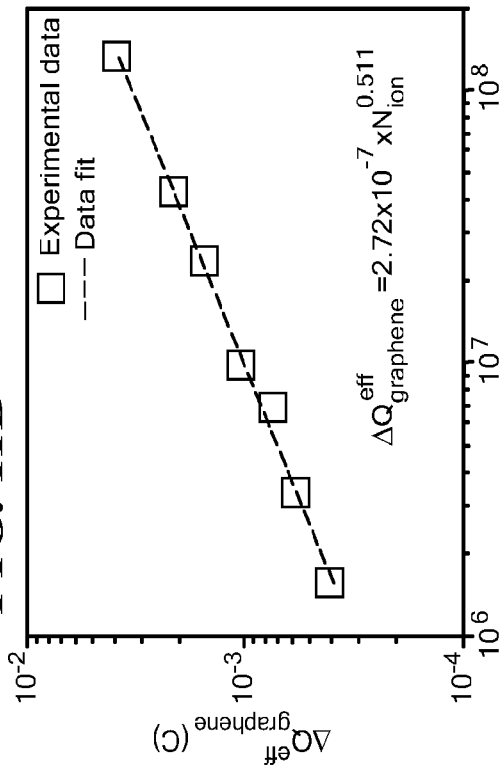
FIG. 11B shows variation of the effective charge change, $\Delta Q_{graphene}^{eff}$, as a function of $N_{ion}$.
Figure 11D:
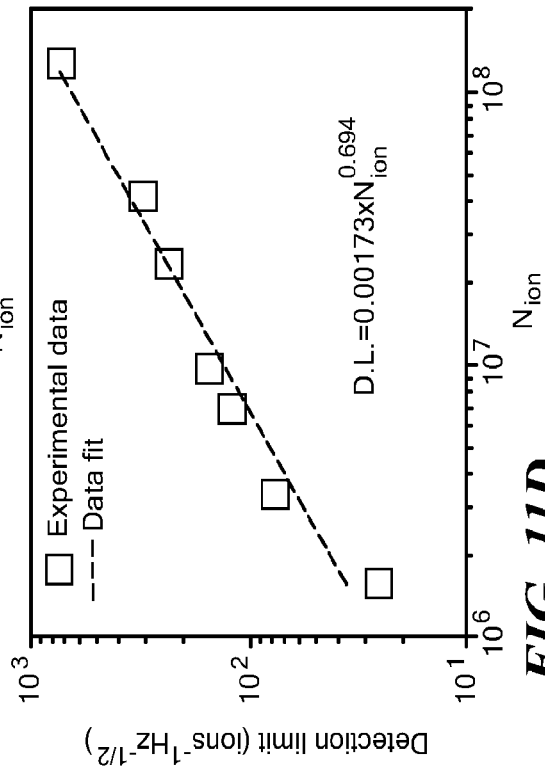
FIG. 11D shows variation of the detection limit as a function of $N_{ion}$.
Figure 11A:
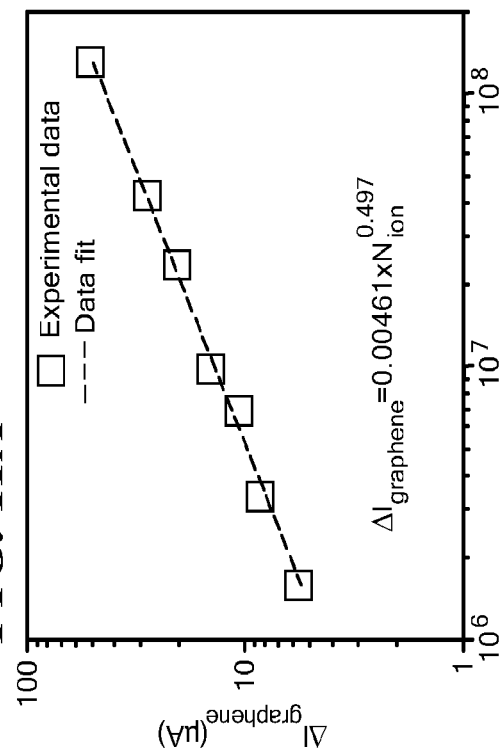
FIG. 11A shows fitting of data of variation of the current change, $\Delta I_{graphene}$, as a function of $N_{ion}$.
Figure 11C:
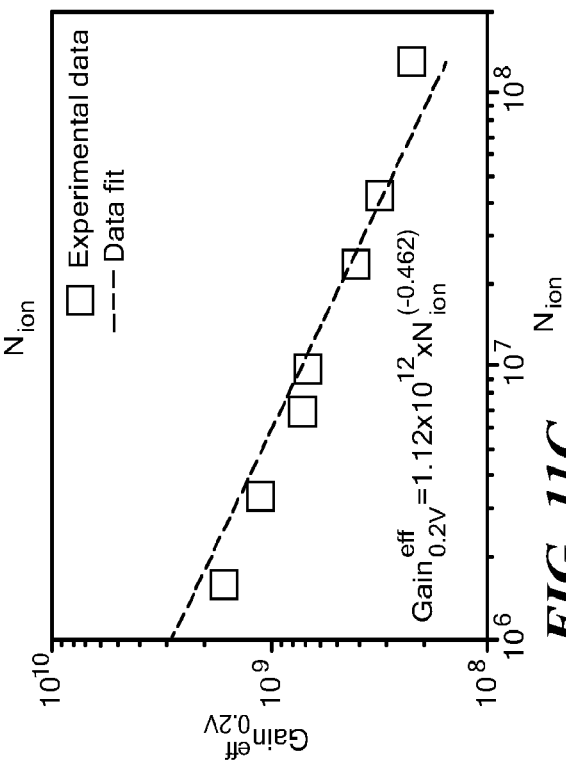
FIG. 11C shows variation of the effective gain, $Gain_{0.2V}^{eff}$, as a function of $N_{ion}$.

Fitting of data for variation of current change, $\Delta I_{graphene}$, as a function of incident ions ($N_{ion}$) is shown in FIG. 11A. Variation of effective charge change, $\Delta Q_{graphene}$, as a function of $N_{ion}$ is shown in FIG. 11B. Variation of effective gain, $Gain_{0.2V}^{eff}$, as a function of $N_{ion}$ is shown in FIG. 11C and variation of detection limit as a function of $N_{ion}$ is shown in FIG. 11D.

Single-Ion Detection by Graphene Ion Detector in Vacuum

Figure 12B:
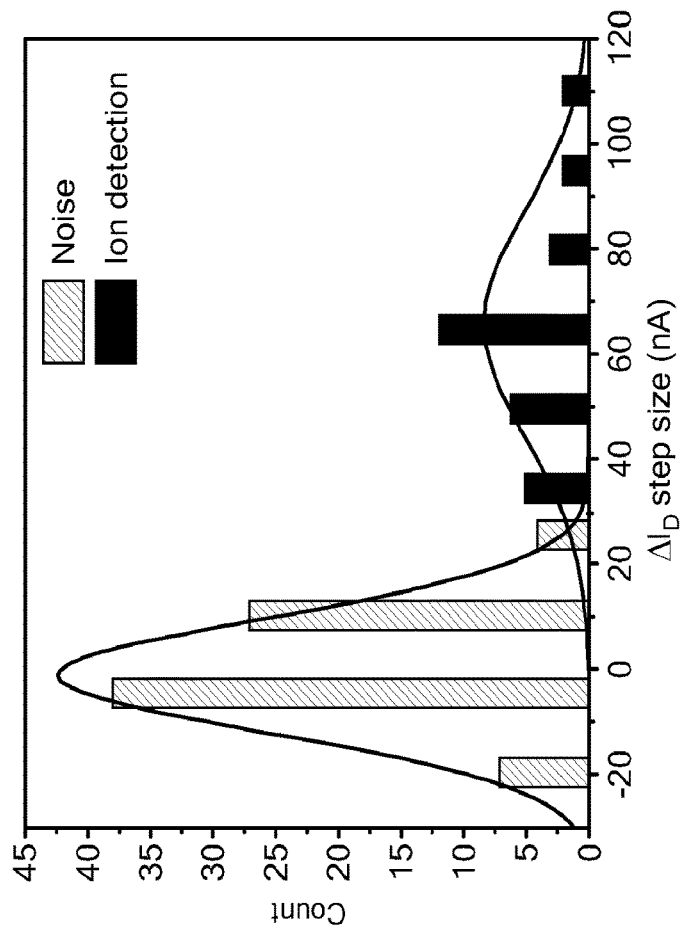
FIG. 12B shows distribution of step jump size and its comparison to in-step fluctuations in graphene device, demonstrating that these two types of changes can be distinguished in a typical detector.
Figure 12A:
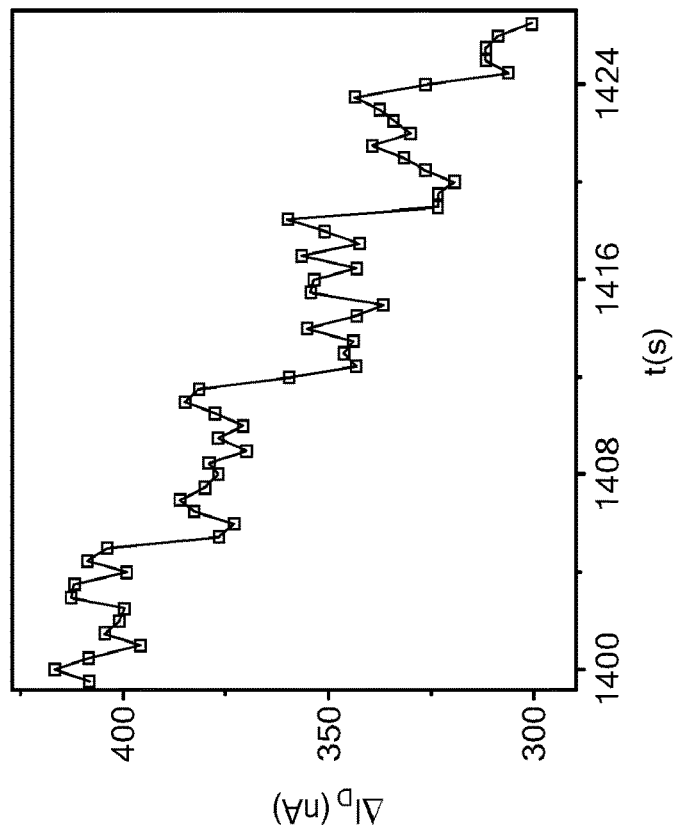
FIG. 12A shows a step-wise decrease in detector current under indirect ion-incidence in a graphene detector, providing evidence of detection of single-ion incidence by graphene.

The graphene detector was also tested for its ability to detect single ions. A step-wise decrease in detector current under indirect ion-incidence in graphene detector was observed (see FIG. 12A), providing evidence of detection of single-ion incidence by graphene. Distribution of step jump size and its comparison to in-step fluctuations in graphene device demonstrated that these two types of changes can be distinguished in a graphene-based ion detector.

Positive and Negative Ions Detection by Graphene Ion Detector in the Air

The graphene detector was also tested for its ability to detect positive and negative ions when exposed to such ions in air (see FIGS. 13A and 13C). Variation of effective gain and detection limits as a function of ion-dosage for positive and negative ion incidences, respectively, was also measured (see FIGS. 13B and 13D). For each type of ion, effective gain show values approaching $10^9$, with detection limit reaching values below 100 ion s$^{-1}$ Hz$^{-1/2}$.

Example 3

Ion Release from Graphene and SWNT Ion Detectors

Figure 14B:
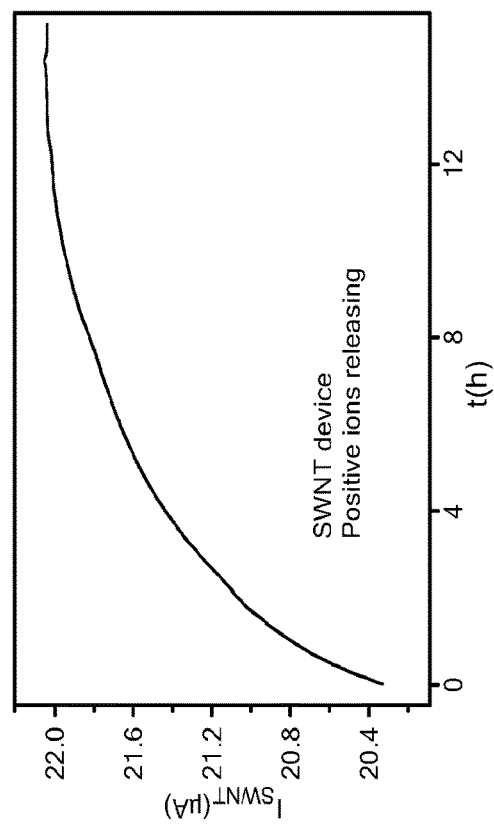
FIG. 14B shows current response of SWNT ion detector during release of positive ions in open air.
Figure 14D:
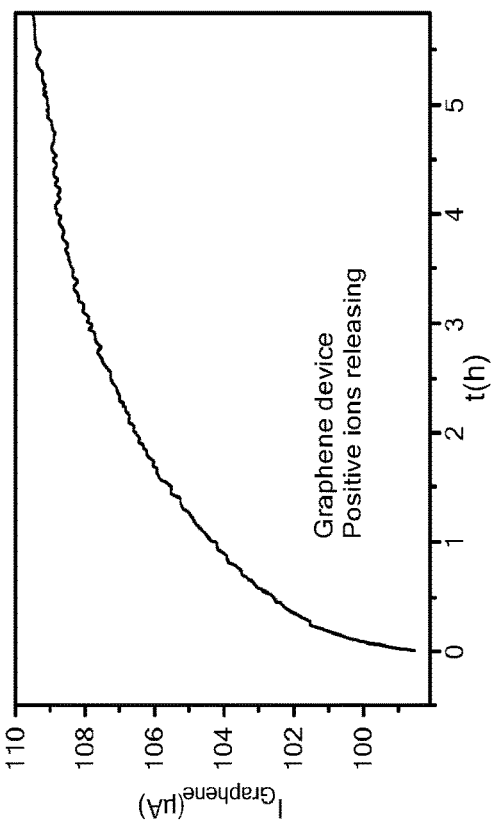
FIG. 14D shows current response of graphene ion detector during release of positive ions in air.
Figure 14A:
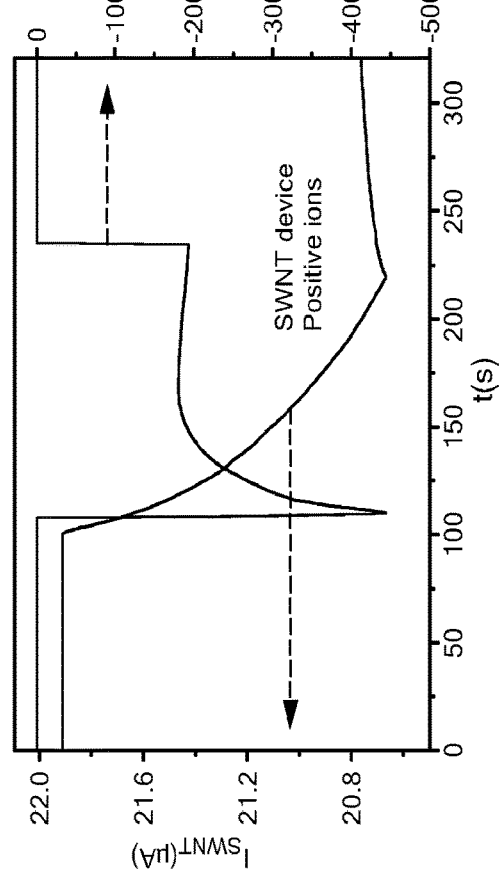
FIG. 14A shows current response of SWNT ion detector and Faraday cup to incident positive ions.
Figure 14C:
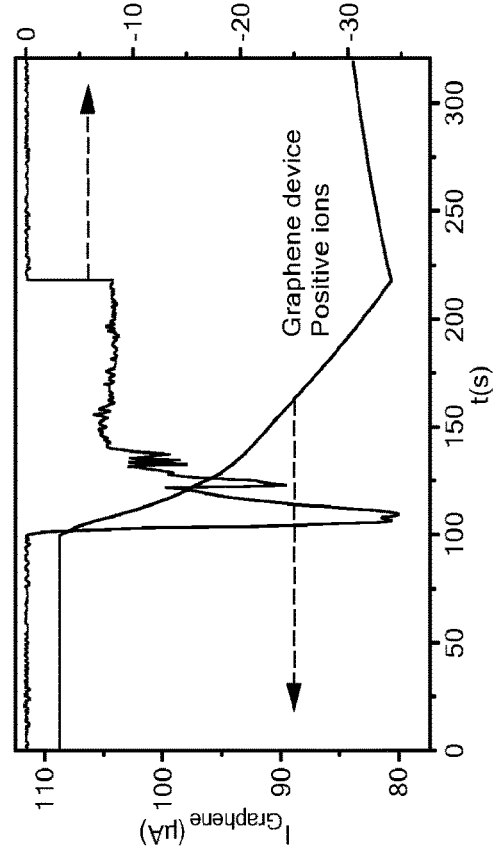
FIG. 14C shows current response of graphene ion detector and Faraday cup to incident positive ions. In each of FIGS. 14A and 14C, the bottom curve contacting the right axis corresponds to the current response of the SWNT ion detector, and the top curve to that of the Faraday cup.

After detection of ions, the graphene/SWNT ion detector was placed in air for release of ions. Comparison of the current of the graphene/SWNT ion detector before ion detection and after ion release in open air showed the two currents to be almost same, indicating that the ions can be fully released from the graphene/SWNTs in open air. FIG. 14A shows current change of SWNT ion detector and Faraday cup in response to positive incident ions. The current of SWNT ion detector decreased from 21.9 µA to 20.7 µA after the positive ion source was opened for 2 minutes. Then the SWNT ion detector was taken out of vacuum chamber and put in open space for ion release. As shown in FIG. 14B, the current of SWNT ion detector gradually went up to 22 µA in around 10 hours due to ions detaching from the surface of SWNT and then remained stable indicating that most of ions were released from the SWNTs. For the graphene ion detector, after 2 min of positive ion detection, the current of graphene ion detector was found to decrease from 108.7 µA to 80.7 µA (see FIG. 14C). After exposing the graphene ion detector to the air, the current of graphene ion detector went back to going back to 108.9 µA in about 4 hours when positive ions were totally released from the graphene (see FIG. 14D).

For release of negative ions in air, the SWNT and the graphene ion detectors were separately exposed to negative ions for 2 minutes in air and then ion release was performed in situ. For the SWNT ion detector, the current went up from 27 µA to 28.7 µA after a 2 min exposure to negative ions (see FIG. 15A) and decreased from 28.8 µA to 27 µA during ion release in the air (FIG. 15B), indicating that the ions attached on the SWNTs were fully released. With regard to the graphene ion detector, the current increased from 122 µA to 136 µA after 2 minutes of detecting negative ion (FIG. 15C). The current gradually decreased from 135 µA to 122 µA in about 6 hour upon release of ions in open air (FIG. 15D).

Example 4

Figure 16A:
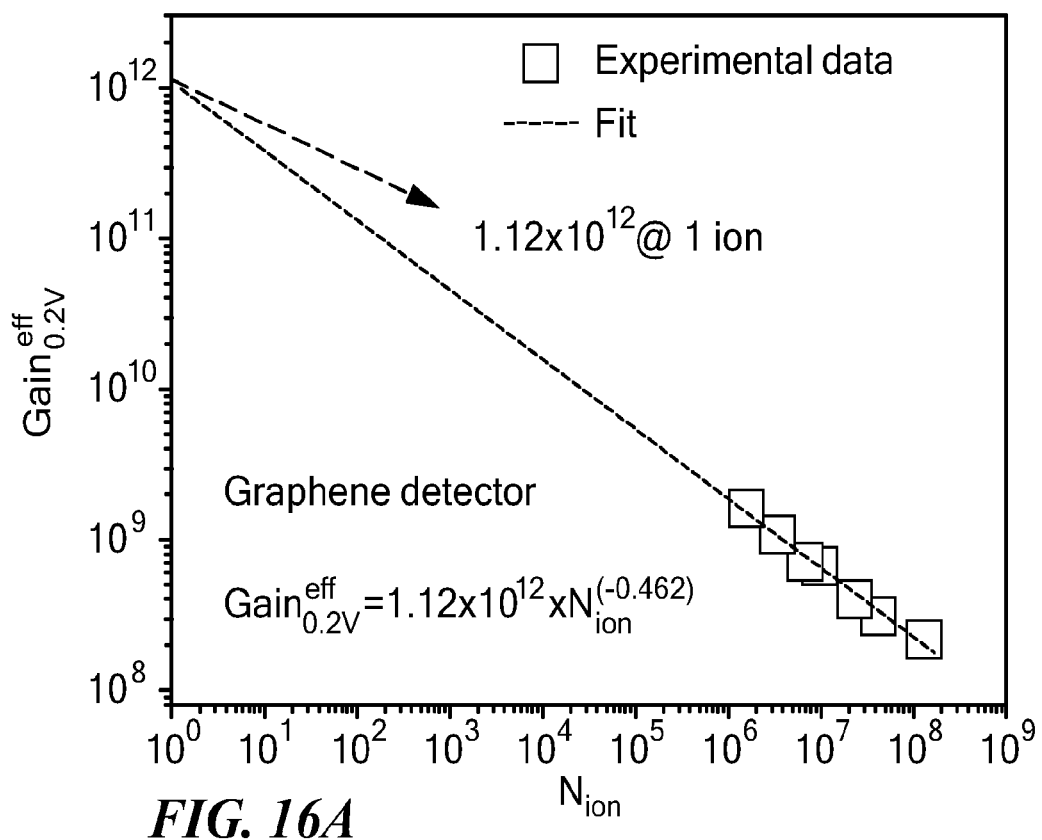
FIGS. 16A and 16B show extrapolated curve fittings of effective gain factor of graphene and SWNT ion detectors, respectively.
Figure 16B:
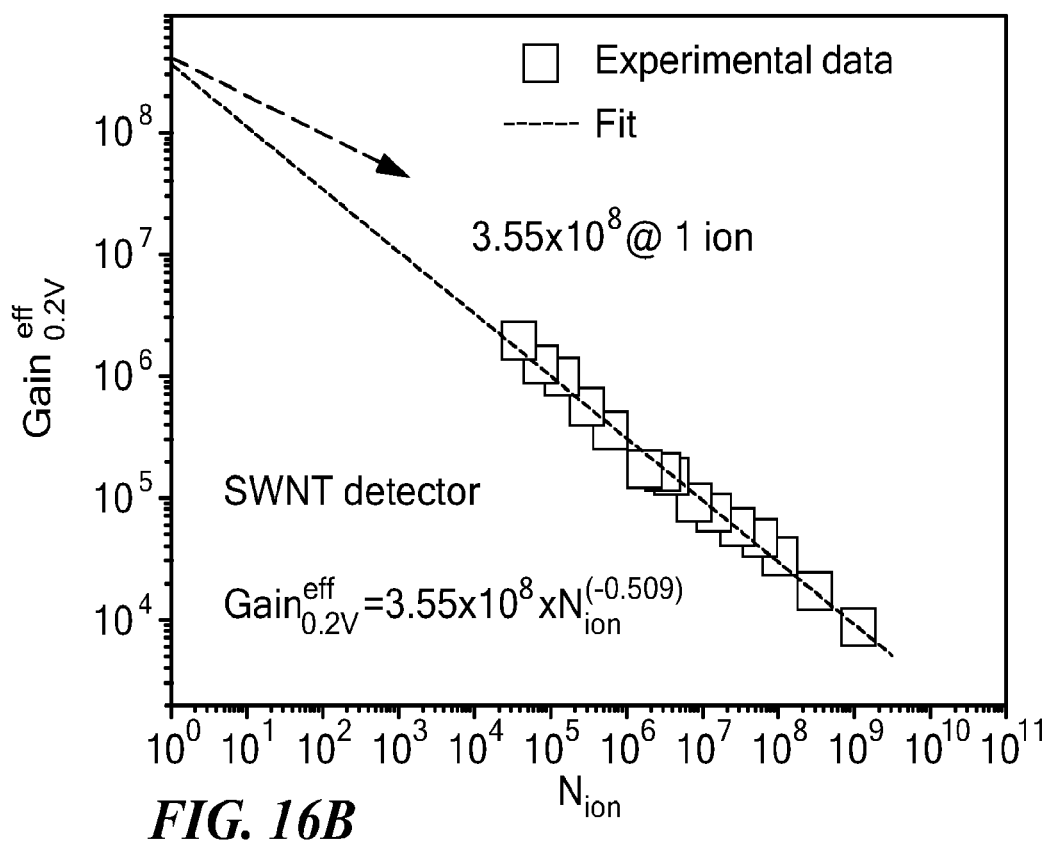

Calculation of Effective Gain of Graphene and SWNT Ion Detectors for a Single Ion For graphene detector, experimental data was fitted using the formula shown in FIG. 16A and the highest effective gain factor was found by extrapolating the fitting curve to 1 ion. This value was found to be $1.12 \times 10^{12}$, which is close to the $gain_{0.2V}^{eff} = 1.96 \times 10^{12}$ obtained by calculating the four $\Delta I_D$ steps seen from FIG. 12A. For SWNT ion detector, the experimental data was fitted using the formula as shown in the FIG. 16B. The highest effective gain factor was found by extrapolating the fitting curve to 1 ion. This value is $3.55 \times 10^8$.

Example 5

Response of SWNT and Graphene Ion Detectors to Uncharged Air Flow

Figure 17A:
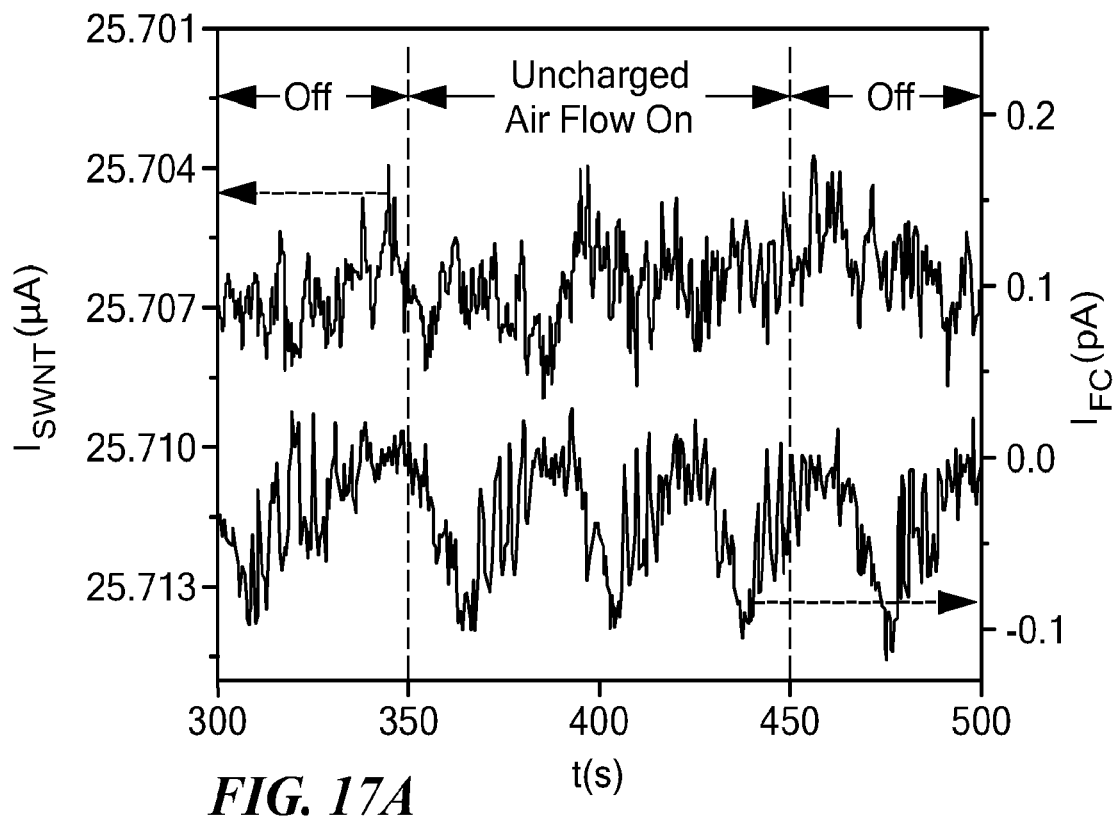
FIGS. 17A and 17B show current responses, respectively, of SWNT and Graphene ion detectors to uncharged air flow.
Figure 17B:
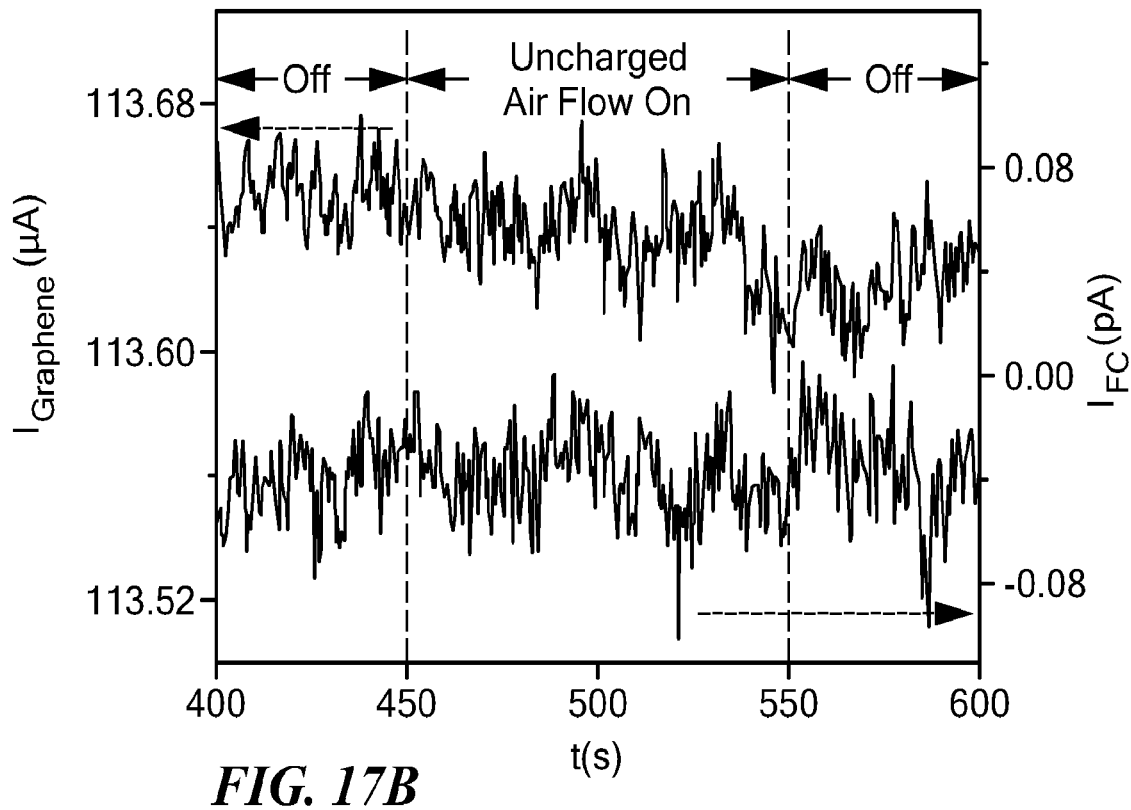

SWNT and graphene ion detectors were tested for whether unchanged air flow can affect their current flow. A cooling fan was used to blow uncharged air towards the SWNT ion detector and Faraday cup which are monitored by source meters. The current response of SWNT ion detector and Faraday cup showed almost no change when uncharged air was blown to them (see FIG. 17A). Similarly, for the graphene ion detector too, no change in current was observed due to flow of uncharged air (see FIG. 17B).

Example 6

Ion Indicator Device

Figure 18D:
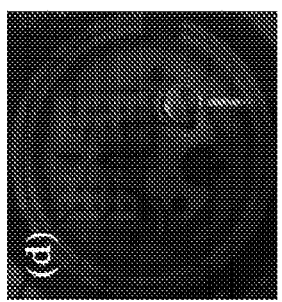
FIGS. 18C and 18D show photographs of the actual device under conditions represented in FIGS. 18A and 18B, respectively.
Figure 18C:
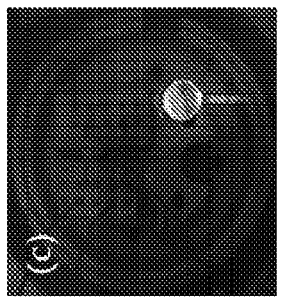
Figure 18B:
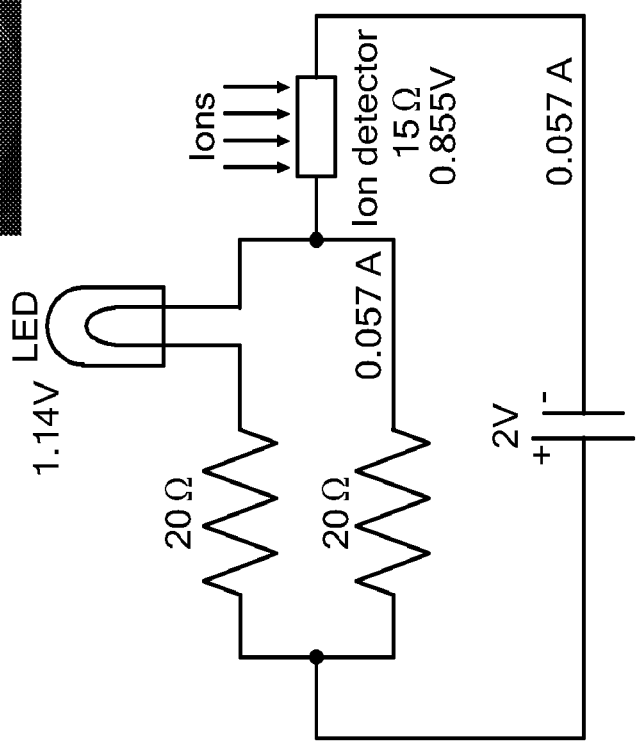
FIGS. 18A and 18B show schematic diagrams of an ion indicator before and after, respectively, of ion detection.
Figure 18A:
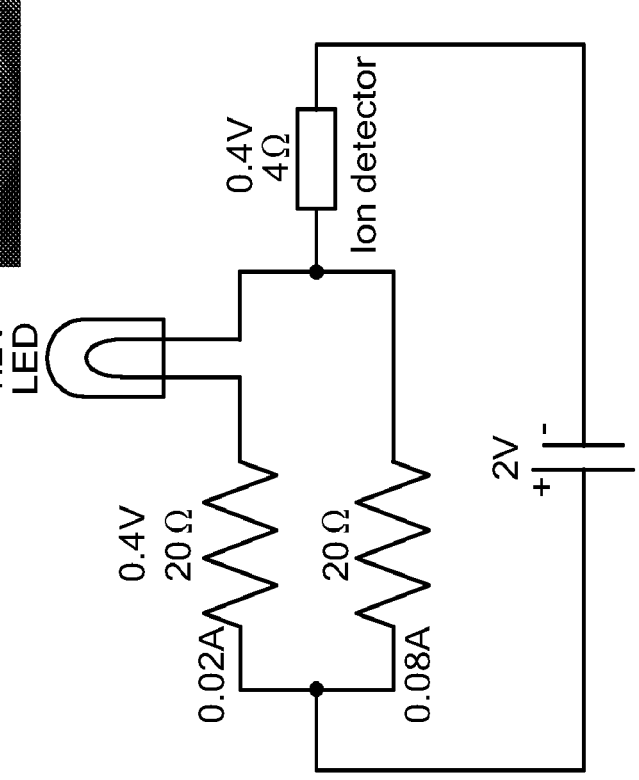

An ion indicator was made by putting several droplets of mixed SWNTs solution on a chip having interdigital electrodes made by lithograph and resistance of 4Ω. Change of brightness of a light-emitting diode (LED) was utilized to show how the SWNT ion detector detects incident ions in the vacuum chamber. A typical voltage divider circuit was designed for this purpose. In this circuit, two 20Ω resistors were used for protecting the LED from large current and sharing partial voltage. Before the positive ion source was opened, voltage of LED was approaching its forward voltage (1.2V) and the LED showed a normal brightness (see FIG. 18A). When the positive ion source was opened, incident positive ions were sensed by the SWNT ion detector causing a gradual increase in its resistance from 4Ω to 15Ω in 2 min as shown in FIG. 18B, making the SWNT ion detector share more voltage than before, and lowering the voltage applied on the LED to a level lower than its forward voltage. Thus, with the ion source on, with time the brightness of the LED kept decreasing.

Example 7

Current Response of SWNT Detector to Incident X-ray Radiation

Figures 19A, 19B:
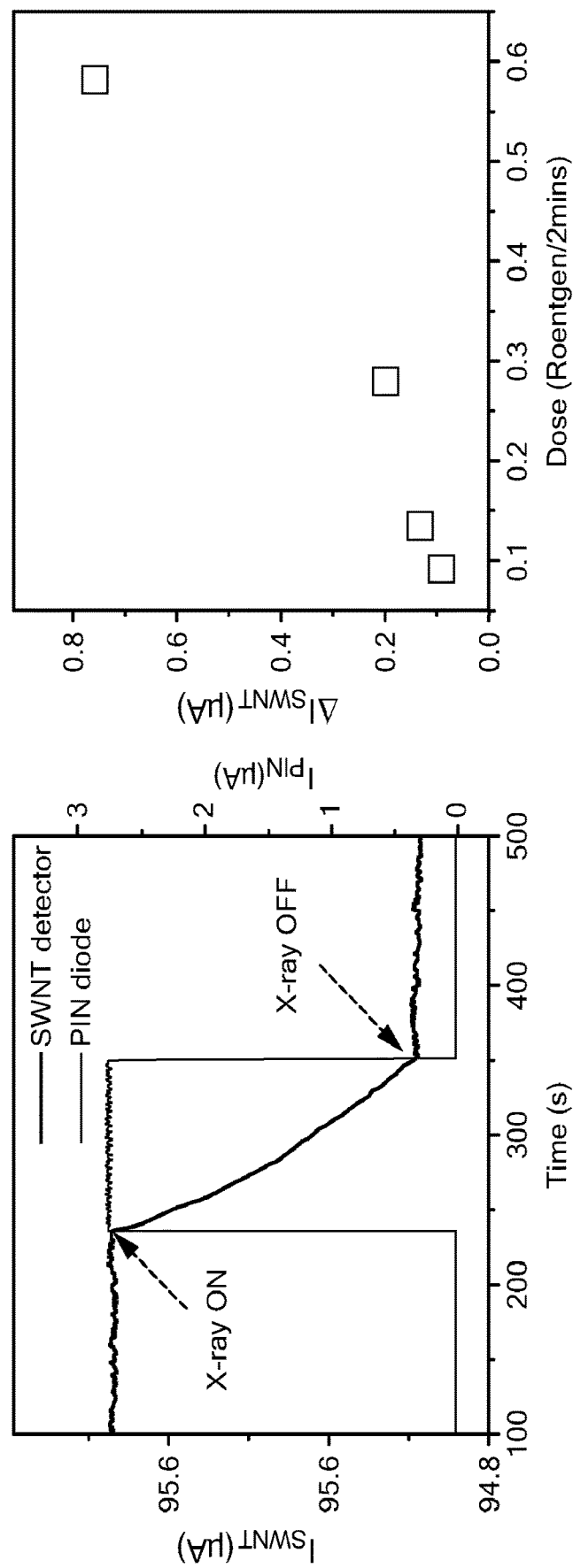
FIG. 19A is a graph showing current response of SWNT detector and PIN diode for detection of X-ray radiation as the X-ray source is on and off. The top and the bottom curves contacting the right axis correspond, respectively, to the current response of the SWNT detector and PIN diode.
FIG. 19B shows that the current change of the SWNT detector depends on the dose of X-ray radiation.

Current response of a SWNT detector to incident X-ray radiation in air at atmospheric pressure was measured. A bias of 0.2V bias was applied to the SWNT detector. It was observed that when the X-ray radiation source was on, the current of SWNT detector decreased and when the radiation source was closed, the current became stable (see FIG. 19A). A commercial PIN diode with 70V reversed bias was used to measure the intensity of the X-ray radiation at the same time. The PIN diode was placed at the same plane as the SWNT detector and close to it. The blue curve shows the current response of the PIN diode to the X-ray radiation as the radiation is turned on and off. Current change of the SWNT detector in response to different doses of radiation was also measured and was found to be proportional to the dose of the radiation (see FIG. 19B).

Example 8

Device for Detection of X-ray Radiation

Figure 20B:
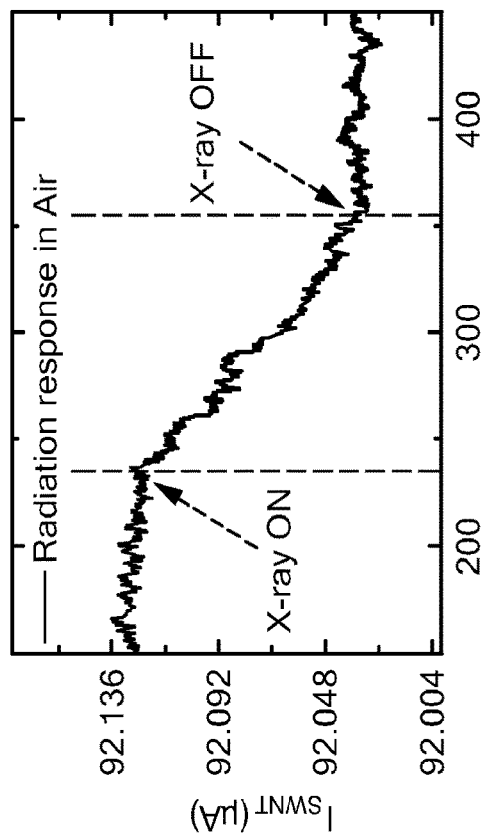
FIG. 20B shows current response of the SWNT detector to X-ray radiation when the chamber is filled with air.
Figure 20C:
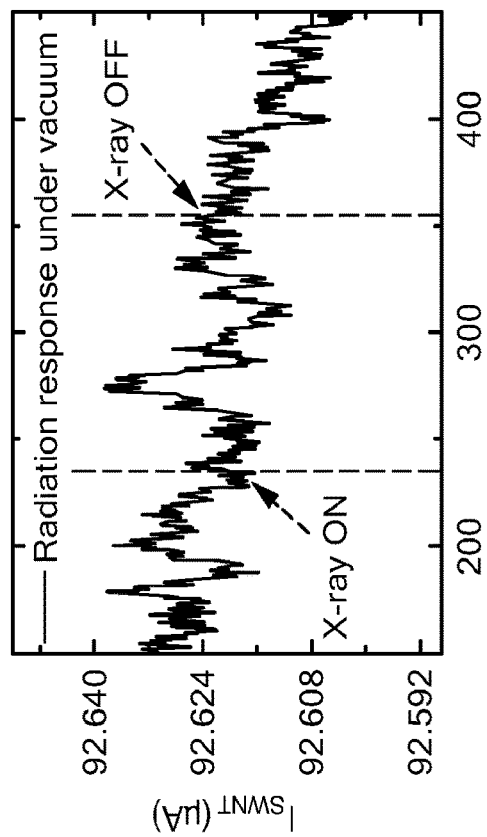
FIG. 20C shows the response under vacuum condition.
Figure 20A:
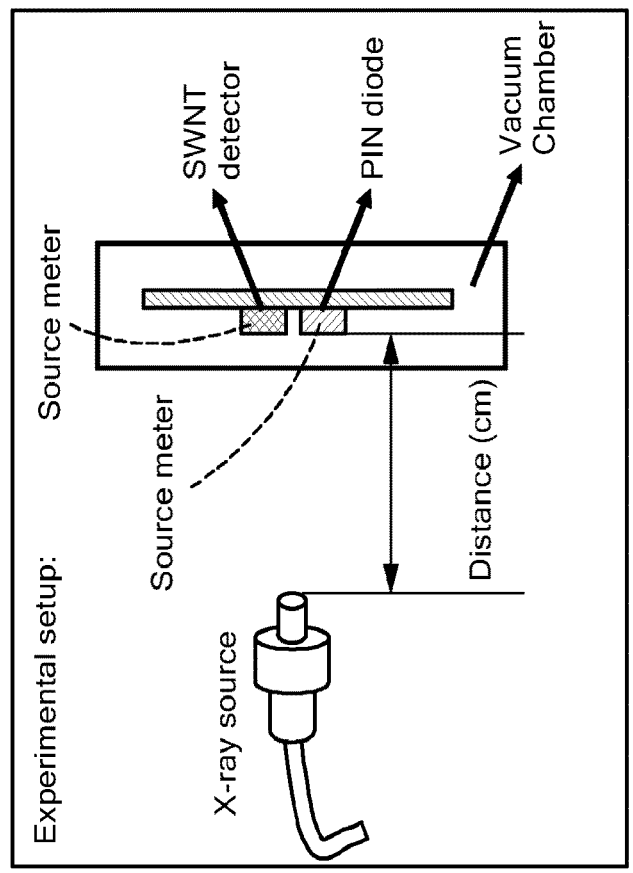
FIG. 20A is a schematic diagram showing the experimental setup of a gas-filled ionization chamber with SWNT detector and a PIN diode.
Figure 21A:
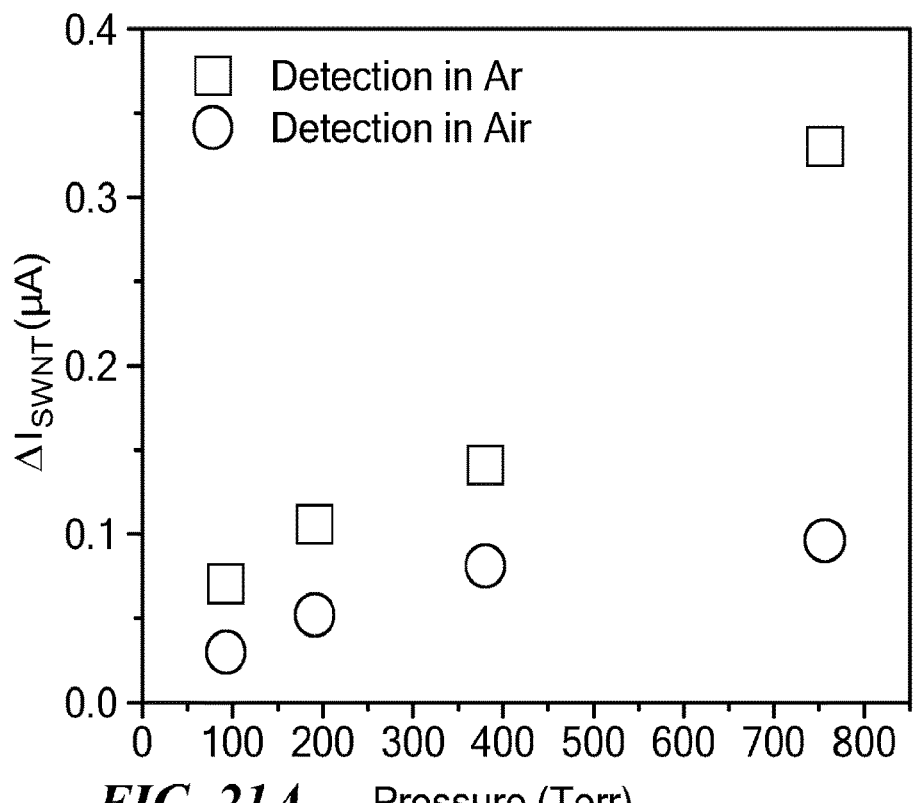
FIG. 21A is a graph showing current change of a SWNT detector having either argon or atmospheric air at different pressures.
Figure 21B:
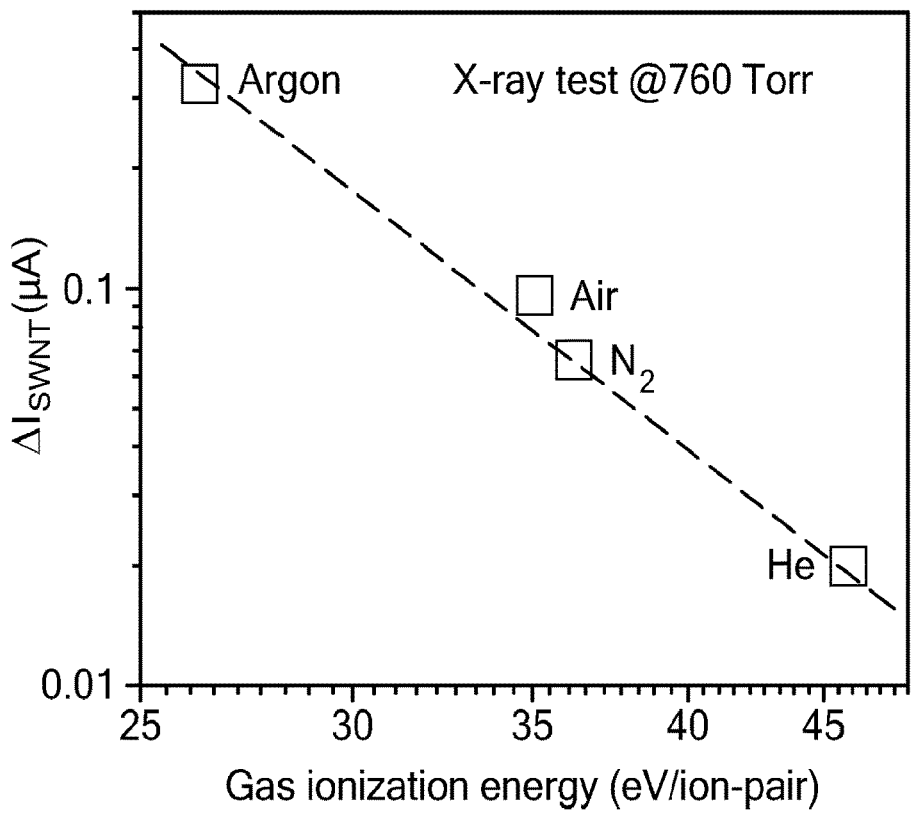
FIG. 21B shows current response of the SWNT detector to X-ray radiation when the chamber is filled with one of argon, air, nitrogen, or helium.
Figure 22A:
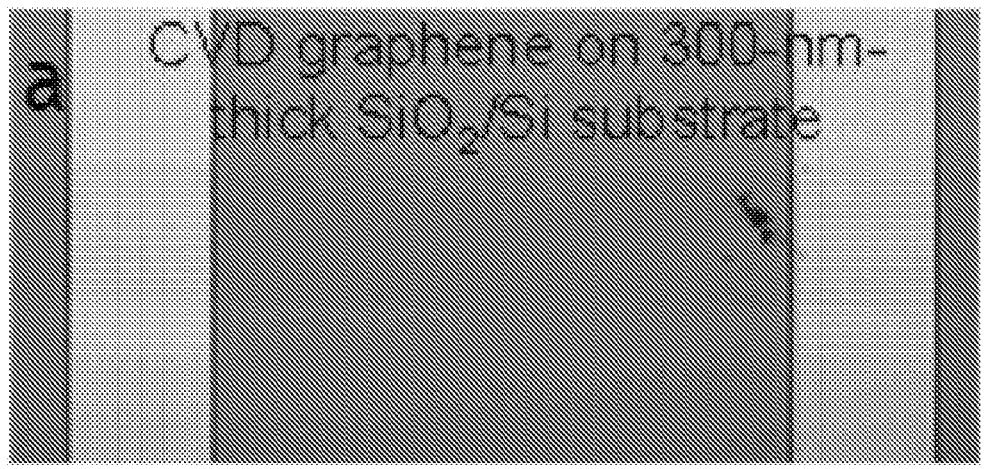
FIG. 22A shows an optical image of a graphene device for sensing ions.
Figure 22B:
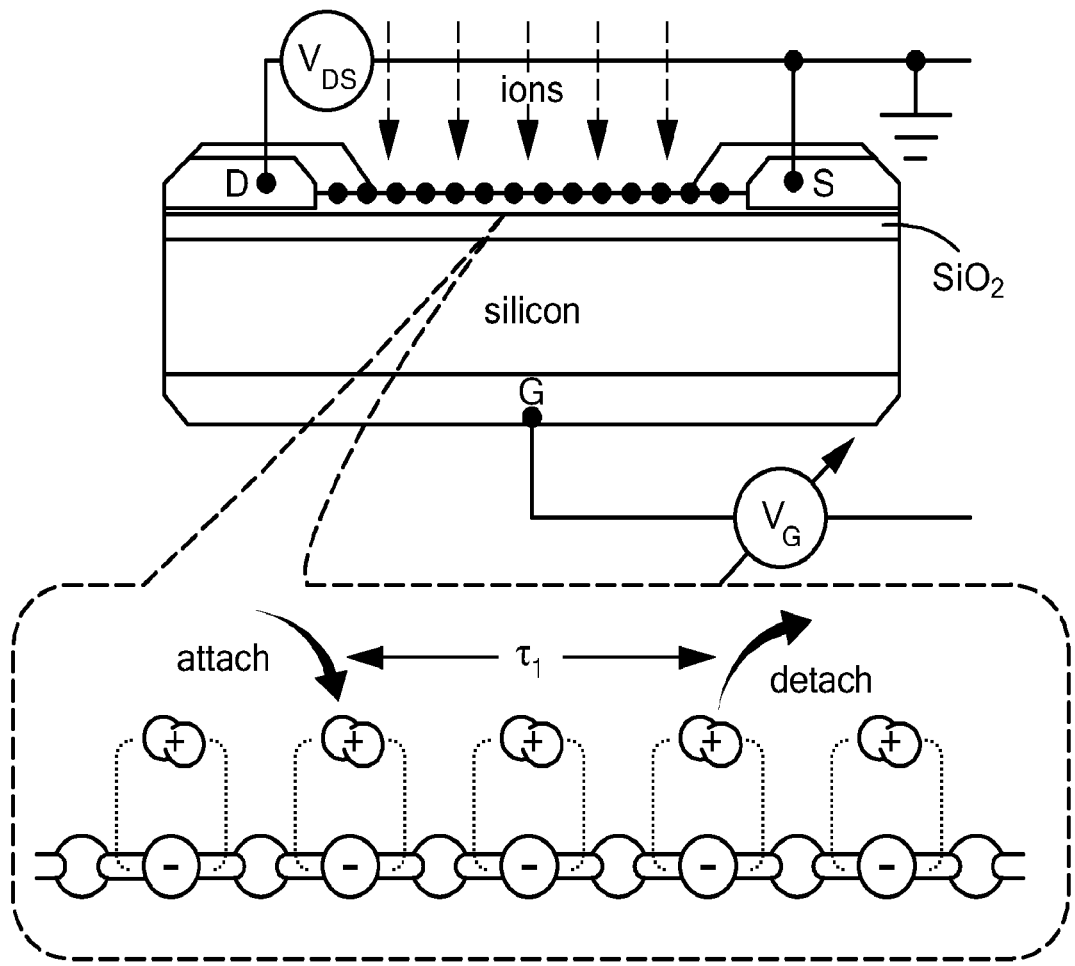
FIG. 22B shows a schematic diagram of a 3-terminal graphene FET device with incident positive ions (mostly $N_2^+$).
Figure 22C:
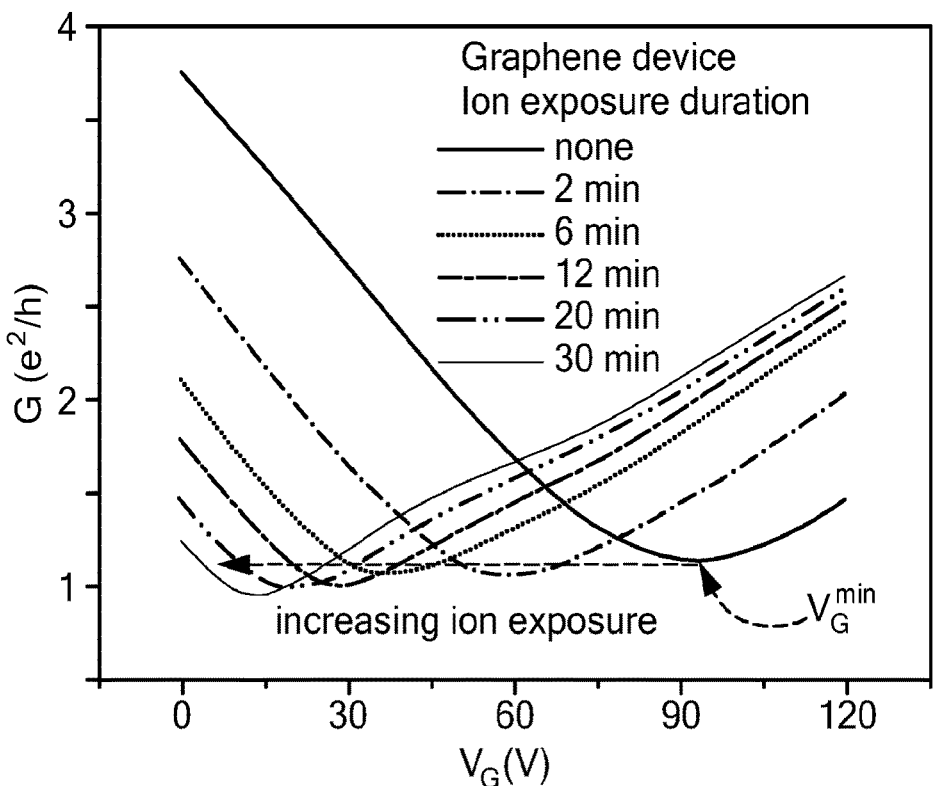
FIG. 22C shows gate-modulated channel-conductance shifting to the left under ion-dosing, indicating induced n-type carriers, thereby establishing a gating-effect (and not a doping effect).
Figure 22D:
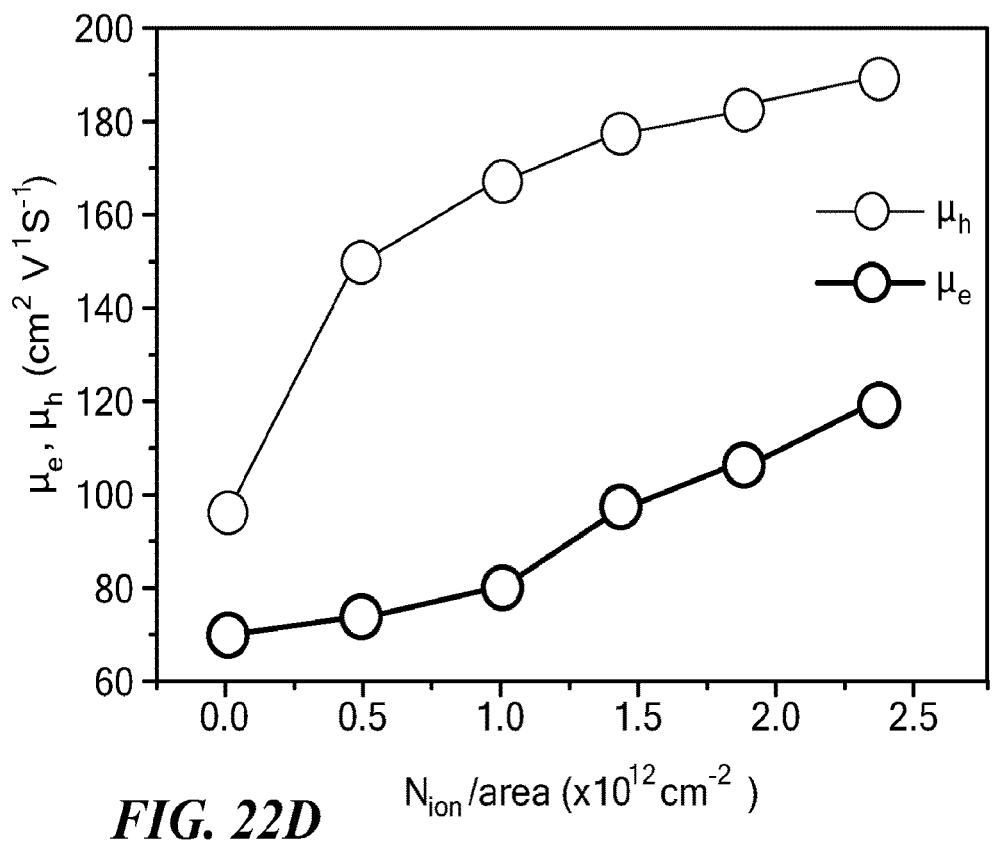
FIG. 22D shows variation of electron and hole mobility of graphene as a function of ion incidence and absence of any degradation due to ion-attachment. The top and the bottom curves correspond, respectively, to holes and electrons.

The setup used for detection of X-ray radiation using a SWNT detector is shown in FIG. 20A. The X-ray source is placed outside the vacuum/ionization chamber pointing toward the SWNT detector and PIN diode. The current flowing through the SWNT detector and the PIN diode are separately monitored by source meters. The pressure of vacuum chamber can be adjusted using a vacuum pump. As air was allowed to fill the chamber and reach atmosphere pressure and the X-ray source was turned on, the current of SWNT detector began to decrease. When the X-ray source was turned off, the current stopped decreasing and reached equilibrium. It was observed that when the chamber was under the vacuum (pressure down to 43 mTorr) and the X-ray source was turned on, there was no current response from the detector. These results clearly demonstrated that the SWNT detector has no direct response to X-ray radiation. It is only through gas molecules ionized by the X-ray radiation to charged gas molecules, that the detector is able to detect charged gas molecules. Thus, using the gas molecules as a medium, the SWNT detector can be used as a radiation detector for detecting the X-ray radiation.

Example 9

Ion Detection Using Two-Dimensional (2D) Nanomaterial

Effects of incident ions on two-dimensional nanomaterial were observed. Through selective exposure of 2D materials to positive/negative ions, an increase in the n-type or p-type carriers, was observed. Ion-exposure experiments were performed on a variety of nanomaterials, both under vacuum (P~$10^{-5}$ Torr) as well as in open air (using different commercially-available positive and negative ion generators). Both conditions were found to be equally effective. FIGS. 22A-22D show results of ion-incidence experiments on a gated, 3-terminal graphene device, in which the metal-graphene contact area was covered with a photoresist layer to eliminate any contact-induced effect.

Figure 23A:
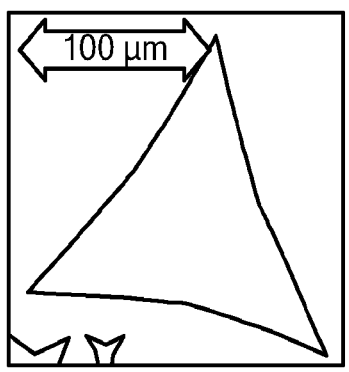
FIG. 23A shows an optical image of a device using a monolayer of $MoS_2$ to detect ions.
Figure 23B:
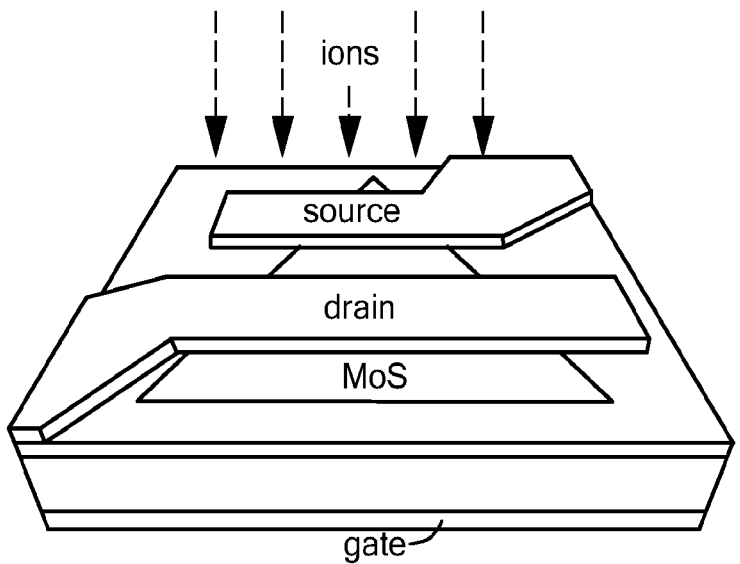
FIG. 23B shows a schematic diagram of a 3-terminal monolayer $MoS_2$ transistor device with incident ions.
Figure 23C:
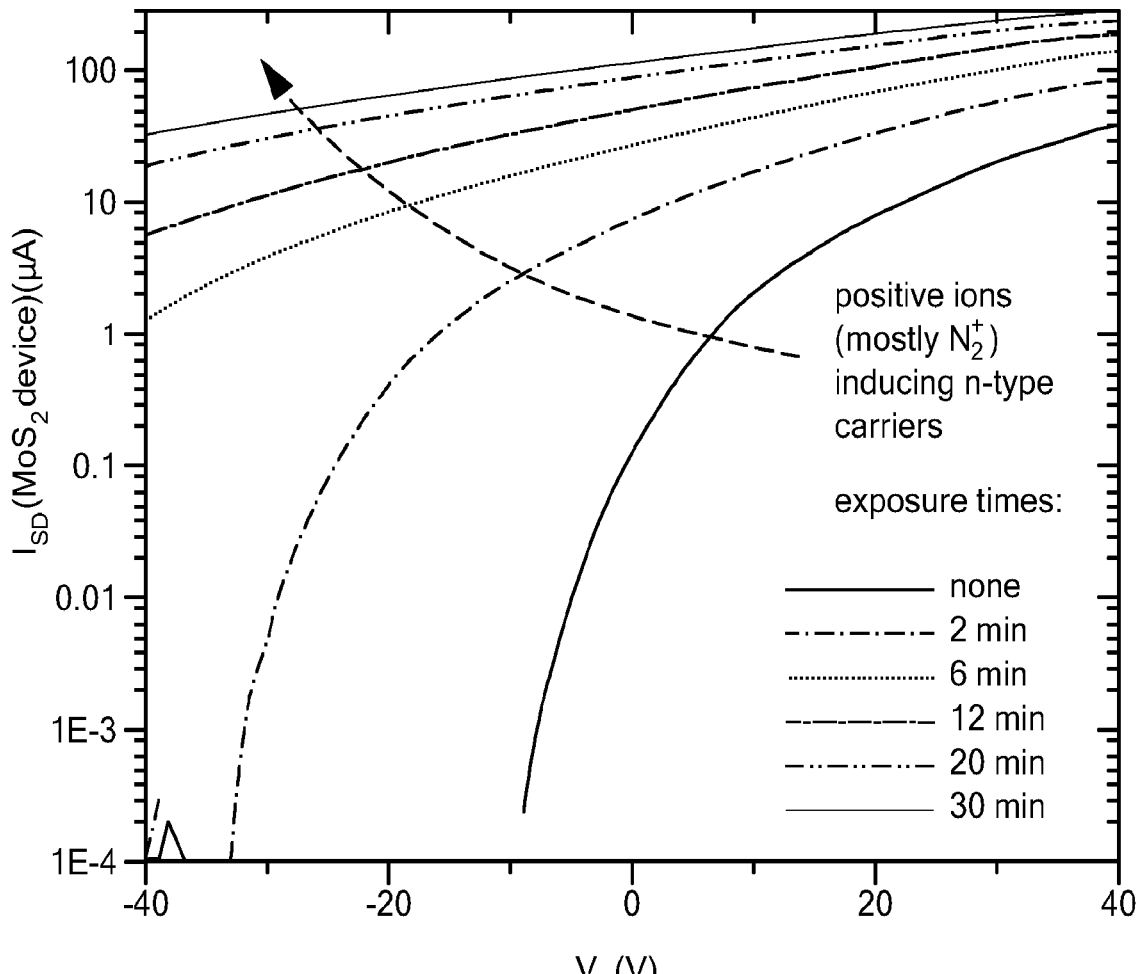
FIGS. 23C and 23D show gate-modulated channel-conductance shifting, respectively, to the left (under positive ion incidence) and to the right (under negative ion incidence), revealing that both n-type (FIG. 23C) and p-type (FIG. 23D) carriers can be induced.
Figure 23D:
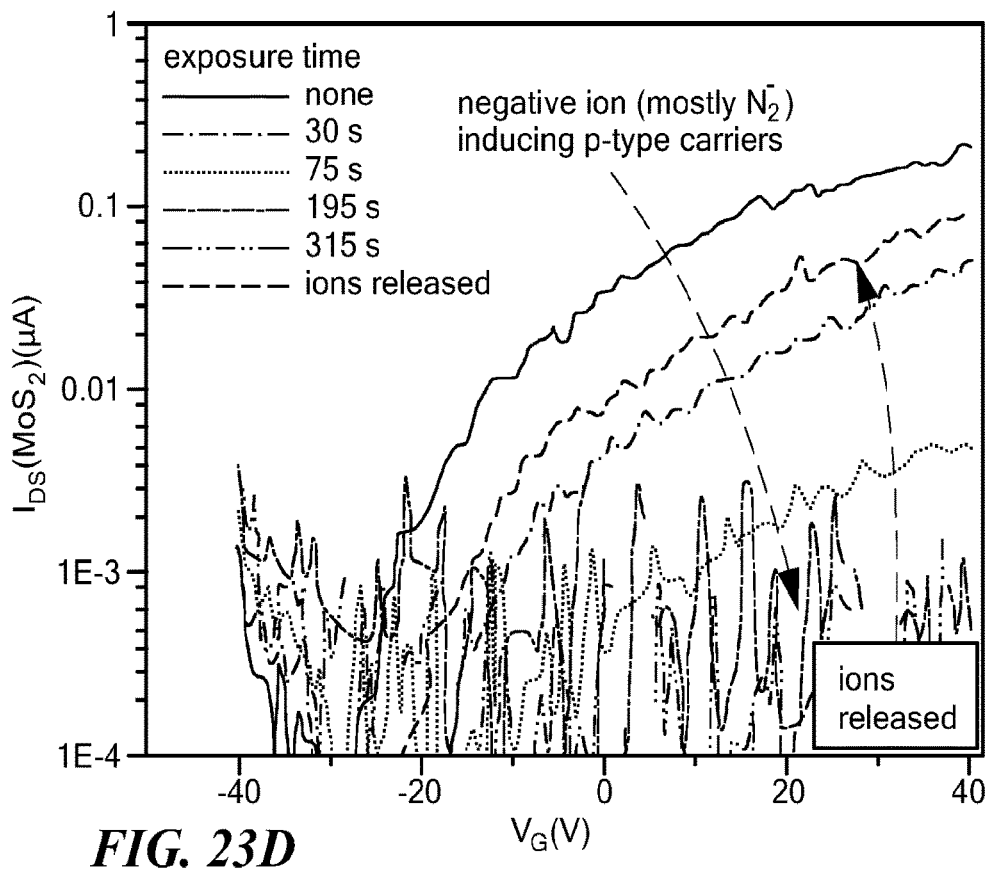
Figure 23E:
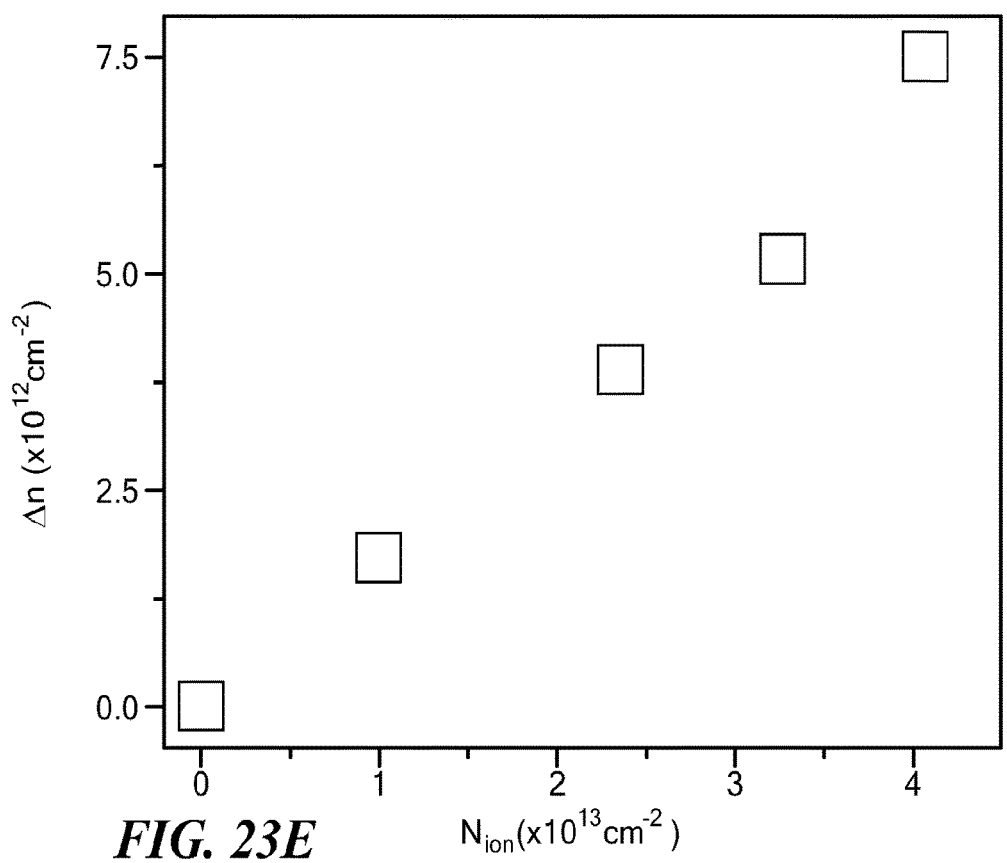
FIG. 23E shows variation of the magnitude of induced carrier density, $\Delta n$, with increasing positive ion incidence.

Similar experiments were performed with $MoS_2$ as the 2D material. Results of these experiments are shown in FIGS. 23A-23E. As in the device with graphene as the nanomaterial, the contact areas were protected prior to ion-exposure. Both positive and negative ions were tested in this device. In addition, different devices were used to eliminate any "history" effect. The transfer curves recover (as seen in FIG. 23D) after overnight release, suggesting that the ions do not form any chemical bonds.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

From the above description, one skilled in the art can easily ascertain the essential characteristics of the present invention, and without departing from the spirit and scope thereof, can make various changes and modifications of the invention to adapt it to various usages and conditions. Thus, other embodiments are also within the scope of the following claims.

What is claimed is:

1. An ion detection device comprising:
   an insulating substrate;
   first and second metallic contact pads disposed on a surface of the substrate;
   a strip of a two-dimensional material, the strip having a first end and a second end, the first end in contact with the first pad and the second end in contact with the second pad, wherein the two-dimensional material is selected from the group consisting of GaS, GaSe, InS, InSe, $HfS_2$, $HfSe_2$, $HfTe_2$, $MoS_2$, $MoSe_2$, $MoTe_2$, $NbS_2$, $NbSe_2$, $NbTe_2$, $NiS_2$, $NiSe_2$, $NiTe_2$, $PdS_2$, $PdSe_2$, $PdTe_2$, $PtS_2$, $PtSe_2$, $PtTe_2$, $ReS_2$, $ReSe_2$, $ReTe_2$, $TaS_2$, $TaSe_2$, $TaTe_2$, $TiS_2$, $TiSe_2$, $TiTe_2$, $WS_2$, $WSe_2$, $WTe_2$, $ZrS_2$, $ZrSe_2$, and $ZrTe_2$; and
   wherein a potential difference applied across the pads causes current to flow through the two-dimensional material and ions contacting the two-dimensional material are detected by a change in the magnitude of said current.

2. The device of claim 1, further comprising a sealed housing forming a chamber enclosing the substrate, contact pads, and strip of two-dimensional material, wherein the chamber is charged with an ionizable gas; and wherein the device functions as an ionizing radiation detector.

3. The device of claim 2, wherein the gas is selected from the group consisting of air, Ar, $N_2$, He, and combinations thereof.

4. The device of claim 2, further comprising a processor, a memory, a transmitter, and a battery, wherein the device is capable of reporting measured values of detected ionizing radiation to a remote receiver.

5. A plurality of the devices of claim 4, linked to form a network for detection of ionizing radiation over an area.

6. The plurality of devices of claim 5, wherein at least 10 of said devices are distributed over the area, and wherein the area comprises a city.

7. The device of claim 1, further comprising a sealed housing forming a chamber enclosing the substrate, contact pads, and strip of two-dimensional material, wherein the chamber is evacuated to form a vacuum within the chamber; and wherein the device functions as a detector of ionized particles capable of penetrating the housing.

8. The device of claim 7, further comprising a processor, a memory, a transmitter, and a battery, wherein the device is capable of reporting measured values of detected ionizing radiation to a remote receiver.

9. The device of claim 1, wherein at least $10^{13}$ carriers/$cm^2$ are induced in the material in the presence of ions.

10. The device of claim 9, wherein about $6 \times 10^{13}$ to about $10^{14}$ carriers/$cm^2$ are induced in the material.

11. The device of claim 1, wherein the charge-current amplification factor value is at least $10^8$ A $C^{-1}$.

12. The device of claim 1, wherein the thickness of the strip of two-dimensional material is in the range from about 1 nm to about 100 nm, and its surface area is in the range from about 200 $nm^2$ to about 1.5 $mm^2$.

13. The device of claim 1, wherein the weight of the device is in the range from about 100 μg to about 1 g.

14. The device of claim 1, further comprising a processor, a memory, a transmitter, and a battery, wherein the device is capable of reporting measured values of detected ions to a remote receiver.

15. The device of claim 1, configured as an ion sensor for use in a mass spectrometer.

* * * * *